US012080867B2

(12) United States Patent
Iwata et al.

(10) Patent No.: US 12,080,867 B2
(45) Date of Patent: Sep. 3, 2024

(54) AIR BATTERY AND MANUFACTURING METHOD OF POSITIVE ELECTRODE OF AIR BATTERY

(71) Applicant: Nippon Telegraph and Telephone Corporation, Tokyo (JP)

(72) Inventors: Mikayo Iwata, Musashino (JP); Masaya Nohara, Musashino (JP); Hiroaki Taguchi, Musashino (JP); Yuzu Kobayashi, Musashino (JP); Takeshi Komatsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 170 days.

(21) Appl. No.: 17/779,917

(22) PCT Filed: Dec. 2, 2019

(86) PCT No.: PCT/JP2019/046987

§ 371 (c)(1),
(2) Date: May 25, 2022

(87) PCT Pub. No.: WO2021/111495

PCT Pub. Date: Jun. 10, 2021

(65) Prior Publication Data

US 2023/0006287 A1 Jan. 5, 2023

(51) Int. Cl.
*H01M 12/06* (2006.01)
*H01M 12/02* (2006.01)
*H01M 50/409* (2021.01)

(52) U.S. Cl.
CPC .......... *H01M 12/06* (2013.01); *H01M 12/02* (2013.01); *H01M 50/409* (2021.01)

(58) Field of Classification Search
CPC ..... H01M 12/02; H01M 12/06; H01M 50/409
See application file for complete search history.

(56) References Cited

U.S. PATENT DOCUMENTS

2004/0224195 A1* 11/2004 Huang .................. H01M 12/06 429/406
2019/0237834 A1* 8/2019 Nohara .............. H01M 4/8652

OTHER PUBLICATIONS

Yejian Xue et al., *Template-Directed Fabrication of Porous Gas Diffusion Layer for Magnesium Air Batteries*, Journal of Power Sources, vol. 297, 2015, pp. 202-207.
Naiguang Wang et al., *Discharge Behaviour of Mg—Al—Pb and Mg—Al—Pb—In Alloys as Anodes for Mg-Air Battery*, Electrochimica Acta, vol. 149, 2014, pp. 193-205.

* cited by examiner

*Primary Examiner* — Karie O'Neill Apicella
(74) *Attorney, Agent, or Firm* — Workman Nydegger

(57) ABSTRACT

The present invention provides an air battery using oxygen in air as a cathode active material, the air battery comprising: a cylindrical anode made of a metal; a cathode constituted by a co-continuous body having a three dimensional network structure formed by an integrated plurality of nanostructures having branches; and a separator that is arranged between the cathode and the anode and absorbs an electrolytic solution, wherein: the cathode is arranged inside the anode via the separator; and the anode has an open hole that reaches the separator and constitutes a housing of the air battery.

11 Claims, 6 Drawing Sheets

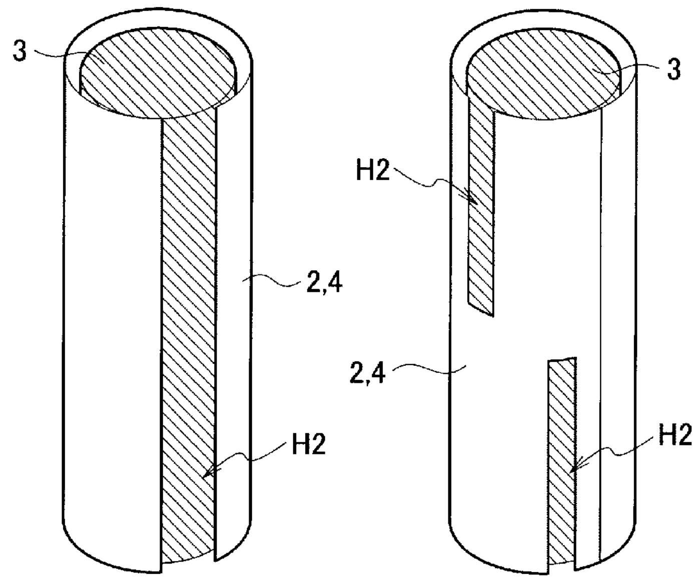
Fig. 9(a)
Fig. 9(b)
3
2,4
H2
H2
3
2,4
H2
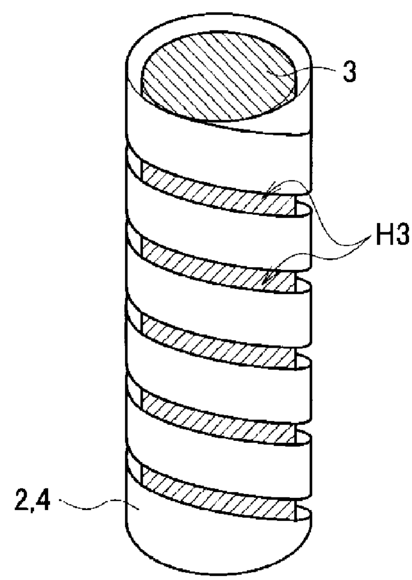
Fig. 10
3
H3
2,4

AIR BATTERY AND MANUFACTURING METHOD OF POSITIVE ELECTRODE OF AIR BATTERY

TECHNICAL FIELD

The present invention relates to an air battery and a method for producing a cathode of an air battery.

BACKGROUND ART

Air batteries have been researched and developed (Non-Patent Literatures 1 and 2). Conventional air batteries are constituted by arranging the cathode outside the battery cell and by arranging the anode inside the battery cell, as they require oxygen in air to be used as the cathode active material. For the cathode, powdery carbon and other materials are used. For the anode, metals such as magnesium, iron, aluminum, and zinc are used.

CITATION LIST

Non-Patent Literature

Non-Patent Literature 1: Y. Xue et al., "Template-directed fabrication of porous gas diffusion layer for magnesium air batteries", Journal of Power Sources, vol. 297, 2015, p. 202 to p. 207

Non-Patent Literature 2: N. Wang et al., "Discharge behaviour of Mg—Al—Pb and Mg—Al—Pb—In alloys as anodes for Mg-air battery", Electrochimica Acta, vol. 149, 2014, p. 193 to p. 205

SUMMARY OF THE INVENTION

Technical Problem

However, since conventional air batteries use a fluororesin as a binder for the powdery carbon and other materials in the cathode, they are not easy to be disposed of at the time of use or at the time of disposal, which raises concerns about the impact on the surrounding environment, and are not easy to be handled.

Also, in conventional air batteries, the cathode is arranged outside the battery cell and the anode, which does not need to be in contact with air, is arranged inside the battery cell. Therefore, a housing for accommodating the cathode, such as powdery carbon, is necessary, and thus the structure of the battery cell is complicated.

The present invention is made in view of the above circumstances, and an object of the present invention is to provide a technology that allows for easy handling of air batteries.

Means for Solving the Problem

One aspect of the present invention provides an air battery using oxygen in air as a cathode active material, the air battery comprising: a cylindrical anode made of a metal; a cathode constituted by a co-continuous body having a three dimensional network structure formed by an integrated plurality of nanostructures having branches; and a separator that is arranged between the cathode and the anode and absorbs an electrolytic solution, wherein: the cathode is arranged inside the anode via the separator; and the anode has an open hole reaching the separator and constitutes a housing of the air battery.

Another aspect of the present invention provides a method for producing a cathode of an air battery using oxygen in air as a cathode active material, the air battery comprising: a cylindrical anode made of a metal; a cathode constituted by a co-continuous body having a three dimensional network structure formed by an integrated plurality of nanostructures having branches; and a separator that is arranged between the cathode and the anode and absorbs an electrolytic solution, wherein: the cathode is arranged inside the anode via the separator; and the anode has an open hole reaching the separator and constitutes a housing of the air battery, the method comprising producing the cathode by a step of freezing a sol or gel in which the nanostructure is dispersed, and a step of drying the frozen body in a vacuum.

Another aspect of the present invention provides a method for producing a cathode of an air battery using oxygen in air as a cathode active material, the air battery comprising: a cylindrical anode made of a metal; a cathode constituted by a co-continuous body having a three dimensional network structure formed by an integrated plurality of nanostructures having branches; and a separator that is arranged between the cathode and the anode and absorbs an electrolytic solution, wherein: the cathode is arranged inside the anode via the separator; and the anode has an open hole reaching the separator and constitutes a housing of the air battery, the method comprising producing the cathode by a step of allowing a predetermined bacterium to produce a gel in which nanofibers of any of iron oxide, manganese oxide, and cellulose are dispersed, a step of freezing the produced gel, a step of drying the frozen body in a vacuum, and a step of carbonizing the dried body.

Effect of the Invention

According to the present invention, a technology that allows for easy handling of air batteries can be provided.

BRIEF DESCRIPTION OF DRAWINGS

FIGS. 9(*a*) and 9(*b*) are external views illustrating the configuration of a cylindrical aluminum-air battery according to Example 2.

FIG. 10 is an external view illustrating the configuration of a cylindrical aluminum-air battery according to Example 3.

DESCRIPTION OF EMBODIMENTS

Hereinafter, with reference to the drawings, embodiments of the present invention will be described. In the description of the drawings, the same part is marked with the same reference sign and the explanation will be omitted.

Configuration of Air Battery

In this embodiment, an aluminum-air battery is used as an example of an air battery.

Figure 1:
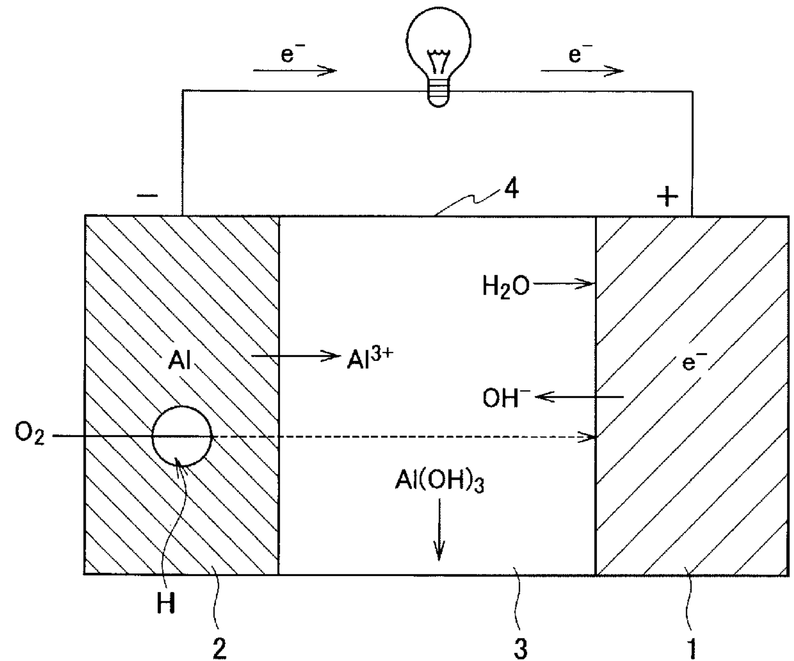
FIG. 1 is a constitutional view illustrating the configuration of an aluminum-air battery.

FIG. 1 is a constitutional view illustrating the configuration of an aluminum-air battery according to an embodiment of the present invention. The aluminum-air battery is an air battery using oxygen in air as a cathode active material. The aluminum-air battery of the present embodiment comprises a cathode (air electrode) 1, an anode 2 constituted to contain aluminum, and an electrolyte 3 arranged between the cathode 1 and the anode 2, in the same manner as conventional aluminum-air batteries. Unlike conventional aluminum-air batteries, the aluminum-air battery of the present embodiment does not require one side of the cathode 1 to be exposed to the atmosphere. Instead, an open hole H is formed in the anode 2 to release the gas generated in the anode 2 into the atmosphere and to take in oxygen from air for use in the cathode reaction in the cathode 1. Note that the electrolyte 3 may be either electrolytic solution or solid electrolyte. The electrolytic solution refers to a case in which the electrolyte 3 is in a liquid form. Also, the solid electrolyte refers to a case in which the electrolyte 3 is in a gel form or solid form.

Configuration of Cathode

The cathode 1 is constituted by a co-continuous body having a three dimensional network structure formed by an integrated plurality of nanostructures having branches. The co-continuous body is a porous body and has an integrated structure. The nanostructure is a nanosheet or nanofiber. Since the integrated plurality of nanostructures have branches, in the co-continuous body having a three dimensional network structure, the branched portion between the nanostructures is deformable, providing a stretchable structure.

The nanosheet may be constituted by, for example, at least one of carbon, iron oxide, manganese oxide, zinc oxide, molybdenum oxide, and molybdenum sulfide. The elements of these materials may be constituted by 22 kinds of elements (C, O, H, N, P, K, S, Ca, Mg, Fe, Mn, B, Zn, Cu, Mo, Cl, Si, Na, Se, Co, Al, and V) indispensable to the growth of plants.

It is important that the nanosheet has electrical conductivity. The nanosheet is a sheet-like substance having a thickness of 1 nm to 1 μm and having planar longitudinal and lateral lengths that are 100 or more times the thickness. Examples of the nanosheet made of carbon include graphene. The nanosheet may be a roll-like sheet or wave-like sheet, may be curved or bent, or may have any shape.

The nanofiber may be constituted by at least one of carbon, iron oxide, manganese oxide, zinc oxide, magnesium oxide, molybdenum oxide, molybdenum sulfide, and cellulose (carbonized cellulose). The elements of these materials may be constituted by 16 kinds of essential elements (C, O, H, N, P, K, S, Ca, Mg, Fe, Mn, B, Zn, Cu, Mo, and Cl) indispensable to the growth of plants.

It is important that the nanofiber also has electrical conductivity. The nanofiber is a fibrous substance having a diameter of 1 nm to 1 μm and a length that is 100 or more times the diameter. The nanofiber may be a hollow fiber or coil-like fiber, or may have any shape. Note that, when the nanofiber is constituted by cellulose, the cellulose is provided with electrical conductivity by carbonization, as will be mentioned later.

Method for Producing Cathode (Brief Description)

A method for producing the cathode 1 will be briefly described. For example, the co-continuous body, which is to be the cathode 1, can be fabricated by at first obtaining a frozen body by freezing a sol or gel in which the nanostructures are dispersed (a freezing step), and drying this frozen body in a vacuum (a drying step). A predetermined bacterium can produce a gel in which nanofibers made of any of iron oxide, manganese oxide, silicon, and cellulose are dispersed (a gel production step).

Also, the co-continuous body may be obtained by allowing a predetermined bacterium to produce a gel in which nanofibers made of cellulose are dispersed (a gel production step), and heating and carbonizing this gel in an inert gas atmosphere (a carbonization step).

The co-continuous body constituting the cathode 1 has, for example, an average pore size of preferably 0.1 to 50 m, and more preferably 0.1 to 2 m. This value of the average pore size is a value determined by a mercury press-in method.

For the cathode 1, it is not necessary to use an additional material, such as a binder for a case in which carbon powder is used, and this is advantageous in both cost and environmental conservation.

Electrode Reactions at Cathode and Anode

Electrode reactions in the cathode 1 and the anode 2 will be described. Here, as a reaction example, aluminum is used for the anode 2. When using an anode that will be an n-valent metal ion, there occurs a reaction that releases n electrons. In the cathode reaction, oxygen in the air and the electrolyte 3 come in contact with each other on the surface of the cathode 1 having electrical conductivity, and thus a reaction indicated by "$\frac{1}{2}O_2+H_2O+2e^-\rightarrow 2OH^-$ . . . (1)" progresses. On the other hand, in the anode reaction, a reaction "$Al+3OH^-\rightarrow Al(OH)_3+3e^-$ . . . (2)" progresses in the anode 2 in contact with the electrolyte 3, and the metal constituting the anode 2 releases electrons and is dissolved in the electrolyte 3 as a metal ion.

Through these reactions, discharge between the cathode 1 and the anode 2 can be carried out. The overall reaction is "$2Al+3H_2O+3/2O_2\rightarrow 2Al(OH)_3$ . . . (3)", and this reaction produces aluminum hydroxide. The theoretical electromotive force is about 2.7 V. The compounds involved in the reactions described above are shown along with the components of FIG. 1.

As described above, in the aluminum-air battery, the reaction indicated by the formula (1) progresses on the surface of the cathode 1, and therefore, it is presumably favorable to generate a large amount of reaction sites inside the cathode 1.

The cathode 1 can be fabricated by a publicly known process such as molding carbon powder with a binder. As mentioned above, in the aluminum-air battery, it is important to generate a large amount of reaction sites inside the cathode 1, and it is thus desirable that the cathode 1 should have a large specific surface area. For example, in the present embodiment, the specific surface area of the co-continuous body constituting the cathode 1 is preferably 200 $m^2/g$ % or more, and more preferably 300 $m^2/g$ or more.

When the specific surface area of a conventional cathode 1 fabricated by molding carbon powder with a binder into a pellet is increased, the binding strength between the carbon powder particles is decreased and the structure is deteriorated. This makes stable discharge difficult and the discharge capacity is decreased.

In contrast, according to the cathode 1 of the present embodiment, constituted by the co-continuous body having a three dimensional network structure formed by an integrated plurality of nanostructures having branches as mentioned above, the conventional problems mentioned above can be solved and the discharge capacity can be increased.

Further Configuration of Cathode

The further configuration of the cathode 1 will be described. The cathode 1 may support a catalyst. The catalyst may be constituted by at least one metal among iron, manganese, zinc, copper, and molybdenum, or a metal oxide of at least one metal among calcium, iron, manganese, zinc, copper, and molybdenum. Note that the elements of these materials may be constituted from metals included in 16 kinds of essential elements indispensable to the growth of plants, and may have catalytic ability. As the metal, iron, manganese, and zinc are preferable, and an oxide formed of one of these metals or a complex oxide formed of two or more of these metals is preferable. In particular, manganese oxide ($MnO_2$) is suitable. Manganese oxide is preferable because it exhibits particularly excellent catalytic performance in the present embodiment.

In addition, it is also preferable that the metal oxide, which is to be the catalyst, should be an amorphous hydrate. For example, it may be a hydrate of the transition metal oxide. More specifically, it may be a manganese oxide (IV)-n hydrate. Note that n is the number of moles of $H_2O$ based on 1 mol of $MnO_2$. Excellent battery performance can be obtained by allowing the surface of the co-continuous body constituting the cathode 1 to support the manganese oxide hydrate as nanosized fine particles in a highly dispersed state.

For example, excellent battery performance can be exhibited by using, as the cathode 1, the co-continuous body of the cathode 1 onto which a manganese oxide hydrate ($MnO_2 \cdot nH_2O$) is highly dispersed and attached (added) as nanosized fine particles. The content of the catalyst contained in the cathode 1 is 0.1 to 70% by weight, and is preferably 1 to 30% by weight based on the total weight of the cathode 1. The battery performance is greatly improved when a transition metal oxide is added as the catalyst to the cathode 1. The cathode 1 and the electrolyte 3 come in contact with each other, and an oxygen gas in the atmosphere is supplied at the same time, thereby forming a triphasic interface of electrolyte-electrode-gas (oxygen) as mentioned above. If the catalyst is highly active in this triphasic interface site, oxygen reduction (discharge) on the electrode surface smoothly progresses, and the battery performance is greatly improved. At this time, since the interaction between the catalyst and oxygen, which is the cathode active material, is strong, the catalyst can adsorb many oxygen species onto its surface or can occlude oxygen species in oxygen vacancies.

As described above, the oxygen species adsorbed onto the surface of the metal oxide constituting the catalyst or occluded in the oxygen vacancies are used in an oxygen reduction reaction as the oxygen source (an active intermediate reactant) of the above formula (1), and the above reaction readily progresses. Examples of materials that effectively function as the catalyst include a metal oxide such as manganese oxide. Instead of the metal oxide, a metal itself can also be used as the catalyst, and the metal functions in the same manner as the above metal oxide.

In the aluminum-air battery, as mentioned above, it is desirable that the reaction sites [the triphasic portions of electrolyte-electrode-air (oxygen) described above], which cause the electrode reaction, should be present as many as possible in order to increase the battery efficiency. From such a viewpoint, it is important that a large amount of the triphasic portions are also present on the surface of the catalyst, and it is preferable that the specific surface area of the catalyst should be large. The specific surface area of the catalyst made of a metal or metal oxide may be 0.1 to 1,000 $m^2/g$, and preferably 1 to 500 $m^2/g$. Note that the specific surface area is obtained by a publicly known BET method using $N_2$ adsorption.

The cathode 1 to which the catalyst is added can be produced by a method for producing the cathode 1, which will be mentioned later.

Anode

Next, the anode 2 will be described. The anode 2 is constituted by an anode active material. This anode active material is not particularly limited as long as it is constituted by a material that can be used as an anode material for aluminum-air batteries, that is, any metal among magnesium, aluminum, calcium, iron, and zinc or an alloy containing these metals as the main component. For example, the anode 2 may be constituted by a material obtained by bonding a metal, metal sheet, or powder, which is to be the anode 2, to a metal foil such as a copper foil with pressure.

The anode 2 can be formed by a publicly known method. For example, when a magnesium metal is used as the anode 2, the anode 2 can be fabricated by piling up a plurality of metal magnesium foils and forming the piled foils into a predetermined shape.

Housing of Air Battery

A housing 4 of the aluminum-air battery may be constituted by a naturally degradable material. The housing 4 may be made from any of a natural product based material, a microorganism based material, and a chemosynthetic material. For example, it can be constituted by a polylactic acid, a polycaprolactone, a polyhydroxyalkanoate, a polyglycolic acid, a modified polyvinyl alcohol, a casein, a modified starch, or the like. A chemosynthetic material such as a polylactic acid derived from plants is particularly favorable. In addition, the shape of the housing 4 is not limited as long as it can be obtained by processing a biodegradable plastic, and it only needs to be equipped with an open hole connected to the open hole H of the anode 2. One example of the material applicable to the housing 4 is a commercially available biodegradable plastic film. In addition, a paper on which a coating film of a resin such as a polyethylene is formed, used for a milk pack and the like, and an agar film can also be used. Alternatively, as for the housing 4, the anode 2 can be used as the housing 4 of the aluminum-air battery. In order to suppress residual of the components of the aluminum-air battery in the natural environment, instead of using the housing 4, it is preferable to use the anode 2 itself as the housing.

Electrolyte

Next, the electrolyte 3 will be described. The electrolyte 3 may be a substance through which metal ions and hydroxide ions can move between the cathode 1 and the anode 2. Examples thereof may include an aqueous solution constituted by a metal salt containing potassium or sodium, existing abundantly on the earth. Note that this metal salt may be constituted by 22 kinds of elements (C, O, H, N, P, K, S, Ca, Mg, Fe, Mn, B, Zn, Cu, Mo, Cl, Si, Na, Se, Co, Al, and V) indispensable to the growth of plants, or elements contained in sea water, rain water, or hot springs. The electrolyte 3 may be constituted by, for example, one or more of acetic acid, carbonic acid, citric acid, malic acid, oxalic acid, phosphoric acid, or a salt thereof, HEPES (4-(2-hydroxyethyl)-1-piperazineethanesulfonic acid), a chloride salt, a pyrophosphate, and a metaphosphate. Citric acid, malic acid, and oxalic acid are used as fertilizers. They work by forming complexes with phosphorus, which is one of the most abundant elements in the fertilizer components, to promote phosphorus absorption by plants. Therefore, it is particularly preferable to use citric acid, malic acid, oxalic acid, or a salt formed therefrom as the electrolyte 3 because they not only exert no influence even when the electrolyte leaks out into soil, but also function as a fertilizer.

In addition, as another material constituting the electrolyte 3, an aromatic anion exchange polymer solid electrolyte or inorganic laminar compound based solid electrolyte, having ionic conductivity by which metal ions and hydroxide ions pass through the electrolyte, may be used.

Others

Note that, in addition to the configuration described above, the aluminum-air battery can include structural members such as a separator, a battery case, and a metal foil (for example, a copper foil), and elements required for general aluminum-air batteries. For these members and elements, those that are conventionally and publicly known can be used. The separator is not particularly limited as long as it is a fibrous material, but a cellulose based separator made from plant fibers or bacteria is particularly preferable.

Method for Producing Air Battery

Next, a method for producing an aluminum-air battery will be described. The aluminum-air battery of the present embodiment can be fabricated by appropriately arranging the cathode 1 obtained by a method for producing an air electrode, which will be mentioned later, the anode 2, and the electrolyte 3, together with other necessary elements based on the structure of a desired aluminum-air battery, in an appropriate container such as a case. For these production procedures for the aluminum-air battery, a conventionally known method can be applied.

Method for Producing Cathode (Specific Description)

Hereinafter, a method for producing the cathode 1 will be described.

Method 1 for Producing Cathode

Figure 2:
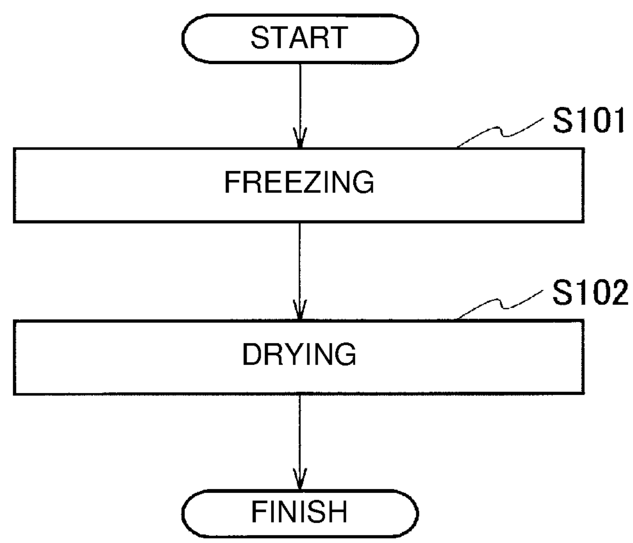
FIG. 2 is a flow chart illustrating a method 1 for producing a cathode.

At first, a method 1 for producing the cathode 1 will be described with reference to FIG. 2. FIG. 2 is a flow chart for describing the method 1 for producing the cathode 1. At first, in step S101, a frozen body is obtained by freezing a sol or gel in which nanostructures such as nanosheets or nanofibers are dispersed (a freezing step). Next, in step S102, a co-continuous body is obtained by drying the obtained frozen body in a vacuum (a drying step).

Hereinafter, more detailed description will be given for each step. The freezing step of step S101 is a step of maintaining or constructing a three dimensional network structure by using a plurality of nanostructures as the raw material of a stretchable co-continuous body having the three dimensional network structure formed of the nanostructures integrated through a noncovalent bond.

Here, the gel means a solid dispersion medium having lost fluidity due to the three dimensional network structure of the nanostructures, which are the dispersoids. Specifically, the gel means a dispersion system having a shear elastic modulus of 102 to 106 Pa. The dispersion medium of the gel may be an aqueous medium such as water ($H_2O$), or an organic medium such as a carboxylic acid, methanol ($CH_3OH$), ethanol ($C_2H_5OH$), propanol ($C_3H_7OH$), n-butanol, isobutanol, n-butylamine, dodecane, an unsaturated fatty acid, ethylene glycol, heptane, hexadecane, isoamyl alcohol, octanol, isopropanol, acetone or glycerin, and two or more kinds thereof may be mixed.

Next, the sol means a colloid formed of a dispersion medium and the nanostructures, which are the dispersoids. Specifically, the sol means a dispersion system having a shear elastic modulus of 1 Pa or less. The dispersion medium of the sol may be an aqueous medium such as water, or an organic medium such as a carboxylic acid, methanol, ethanol, propanol, n-butanol, isobutanol, n-butylamine, dodecane, an unsaturated fatty acid, ethylene glycol, heptane, hexadecane, isoamyl alcohol, octanol, isopropanol, acetone or glycerin, and two or more kinds thereof may be mixed.

The freezing step of step S101 is performed by, for example, accommodating the sol or gel in which the nanostructures are dispersed in an appropriate container such as a test tube, and cooling the surrounding of the test tube in a coolant such as liquid nitrogen, thereby freezing the sol or gel accommodated in the test tube. The approach of freezing is not particularly limited as long as the dispersion medium of the gel or sol can be cooled to the freezing point or lower, and the dispersion medium may also be cooled with a freezer or the like.

By freezing the gel or sol, the dispersion medium loses fluidity and the dispersoids are fixed, thereby constructing the three dimensional network structure. Also, in the freezing step, the specific surface area can be adjusted freely by adjusting the concentration of the gel or sol, and the specific surface area of the obtained co-continuous body is increased as the concentration of the gel or sol is decreased. If the concentration becomes 0.01% by weight or less, however, it becomes difficult for the dispersoids to construct the three dimensional network structure. Therefore, it is suitable that the concentration of the dispersoids should be 0.01 to 10% by weight.

By constructing the three dimensional network structure having a large specific surface area with the nanostructures such as nanofibers or nanosheets, this structure has excellent stretchability when compressed or extended because the pores play the role of a cushion. Specifically, the co-continuous body desirably has a distortion of 5% or more, and more desirably 10% or more at the elastic limit.

If the dispersoids are not fixed by freezing, the dispersoids are aggregated along with the evaporation of the dispersion medium in the subsequent drying step, and therefore, a sufficiently high specific surface area cannot be obtained and it becomes difficult to fabricate the co-continuous body having the three dimensional network structure.

Next, the drying step of step S102 will be described. The drying step is a step of, from the frozen body obtained in the freezing step, taking the dispersoids (a plurality of microstructures that have been integrated) maintaining or constructing the three dimensional network structure out of the dispersion medium.

In the drying step, the frozen body obtained in the freezing step is dried in a vacuum, thereby sublimating the frozen dispersion medium from the solid state. For example, the drying step is performed by accommodating the obtained frozen body in an appropriate container such as a flask, and evacuating the inside of the container. Since the frozen body is placed in the vacuum atmosphere, the sublimation point of the dispersion medium is lowered, and this allows even a substance that is not sublimated at ordinary pressure to be sublimated.

The degree of vacuum in the drying step varies depending on the dispersion medium to be used, and is not particularly limited as long as it enables sublimation of the dispersion medium. For example, when water is used as the dispersion medium, the degree of vacuum must be set such that the pressure is 0.06 MPa or less, but the drying time is prolonged because heat is deprived of as latent heat of sublimation. For this reason, it is suitable that the degree of vacuum should be $1.0\times10^{-6}$ to $1.0\times10^{-2}$ Pa. Furthermore, upon the drying, heat may also be applied by using a heater or the like.

In a method for performing drying in the atmosphere, the state of the dispersion medium is changed from solid to liquid, and subsequently from liquid to gaseous, and therefore, the frozen body is changed into a liquid state and becomes fluidic again in the dispersion medium, thereby demolishing the three dimensional network structure of a plurality of nanostructures. For this reason, it is difficult for the drying in the atmospheric pressure atmosphere to fabricate a stretchable co-continuous body.

Method 2 for Producing Cathode

Figure 3:
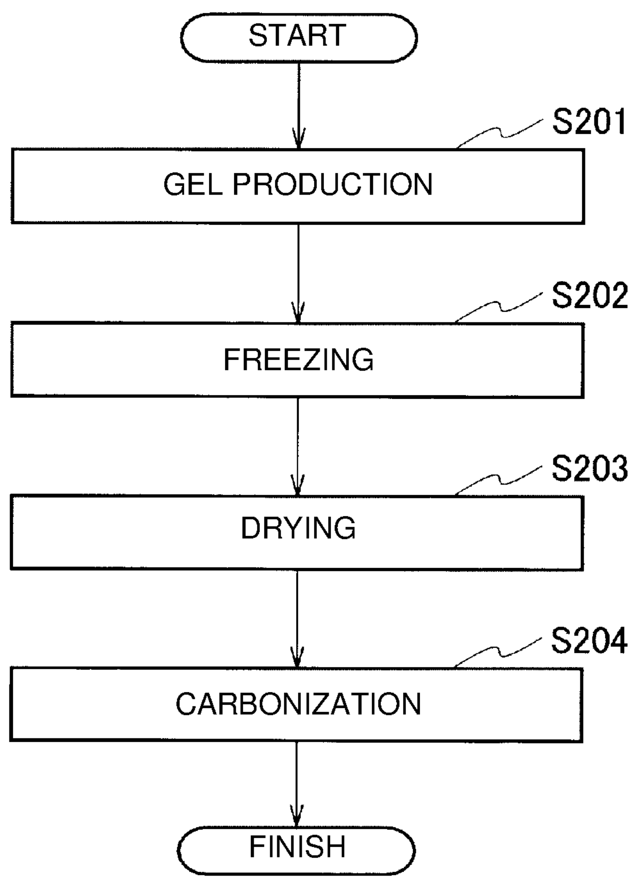
FIG. 3 is a flow chart illustrating a method 2 for producing a cathode.

Next, a method 2 for producing the cathode 1 will be described with reference to FIG. 3. FIG. 3 is a flow chart for describing the method 2 for producing the cathode 1.

At first, in step S201, a gel in which nanofibers made of any of iron oxide, manganese oxide and cellulose are dispersed is produced by a predetermined bacterium (a gel producing step). By using the gel thus obtained, a co-continuous body is fabricated.

The gel produced by a bacterium has a nm-order fiber as a basic structure, and by using this gel to fabricate a co-continuous body, the co-continuous body to be obtained will have a large specific surface area. As mentioned above, it is desirable that the cathode 1 of the aluminum-air battery should have a large specific surface area, and therefore, it is suitable to use the gel produced by a bacterium. Specifically, by using the gel produced by a bacterium, a cathode (co-continuous body) 1 having a specific surface area of 300 $m^2/g$ or more can be synthesized.

The gel produced by a bacterium has a structure in which fibers get entangled into the form of a coil or mesh, and further has a structure in which nanofibers branch based on the proliferation of the bacterium, and therefore, in a co-continuous body that can be fabricated, excellent stretchability with a distortion of 50% or more at the elastic limit is accomplished. Accordingly, a co-continuous body fabricated by using the gel produced by a bacterium is suitable for the air electrode of the aluminum-air battery.

As the gel produced by a bacterium, two or more of bacterial cellulose, iron oxide and manganese oxide may be mixed.

Examples of the bacterium include those publicly known. It may be, for example, an *acetobacter* such as *Acetobacter xylinum* subspecies *sucrofermentans, Acetobacter xylinum* ATCC23768, *Acetobacter xylinum* ATCC23769, *Acetobacter pasteurianus* ATCC10245, *Acetobacter xylinum* ATCC14851, *Acetobacter xylinum* ATCC11142, and *Acetobacter xylinum* ATCC10821, *Agrobacterium, Rhizobium, Sarcina, Pseudomonas, Achromobacter, Alcaligenes, Aerobacter, Azotobacter, Zooglea, Enterobacter, Kluyvera, Leptothrix, Gallionella, Siderocapsa, Thiobacillus*, and those produced by culturing various mutant strains created by subjecting the above bacteria to a mutation treatment by a publicly known method using NTG (nitrosoguanidine) or the like.

As a method in which a co-continuous body is obtained by using a gel produced by the bacterium mentioned above, in the same manner as the production method 1, a frozen body may be obtained by freezing the gel in step S202 (a freezing step) and the frozen body may be dried in a vacuum to obtain a co-continuous body in step S203 (a drying step). However, the bacterial cellulose, which is a component contained in the gel produced by a bacterium, has no electrical conductivity. Therefore, when using it as the cathode 1, the carbonization step (step S204) of carbonizing the co-continuous body by subjecting it to a heat treatment in an inert gas atmosphere, thereby imparting electrical conductivity is important. The co-continuous body thus carbonized has high electrical conductivity, corrosion resistance, high stretchability, large specific surface area, and high catalytic activity, and hence is suitable as the cathode 1 of the aluminum-air battery.

In carbonization of a bacterial cellulose, the carbonization may be performed by synthesizing a co-continuous body having a three dimensional network structure formed of the bacterial cellulose in the freezing step and drying step mentioned above, and subsequently calcining the co-continuous body in an inert gas atmosphere at 500° C. to 2000° C., and more preferably 900° C. to 1800° C. The gas that does not burn the cellulose may be an inert gas such as nitrogen gas or argon gas. Alternatively, the gas may be a reducing gas such as hydrogen gas or carbon monoxide gas, or may be carbon dioxide gas. In the present embodiment, it is more preferable to use carbon dioxide gas or inert gas containing carbon dioxide gas, which has an activation effect to a carbon material and is expectedly capable of highly activating the co-continuous body.

Method 3 for Producing Cathode

Figure 4:
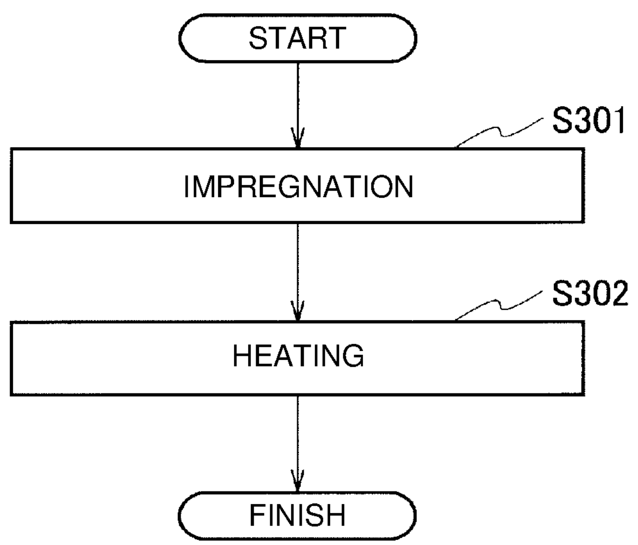
FIG. 4 is a flow chart illustrating a method 3 for producing a cathode.

Next, a method 3 for producing the cathode 1 will be described with reference to FIG. 4. FIG. 4 is a flow chart for describing the method 3 for producing the cathode 1. As mentioned above, a catalyst may be supported on the cathode 1. In step S301, the co-continuous body obtained by the production method 1 or production method 2 mentioned above is impregnated with an aqueous solution of a metal salt, which is to be a precursor of a catalyst (an impregnation step). After a stretchable co-continuous body containing the metal salt is prepared as such, the stretchable co-continuous body containing the metal salt may then be subjected to a heating treatment in step S302 (a heating step). Note that the metal in the metal salt to be used is preferably at least one metal selected from the group consisting of iron, manganese, zinc, copper and molybdenum. Manganese is particularly preferable.

In order to allow the co-continuous body to support a transition metal oxide, a conventionally known method can be used. For example, mention may be made of a method in which the co-continuous body is impregnated with an aqueous solution of a transition metal chloride or transition metal nitrate, the solution is evaporated to dryness, and the co-continuous body is then subjected to hydrothermal synthesis in water ($H_2O$) at high temperature and high pressure. Mention may also be made of a sedimentation method in which the co-continuous body is impregnated with an aqueous solution of a transition metal chloride or transition metal nitrate and an aqueous alkaline solution is dropped thereonto. In addition, mention may also be made of a sol-gel method in which the co-continuous body is impregnated with a transition metal alkoxide solution and then subjected to hydrolysis. The conditions for each of these liquid phase methods are publicly known, and these publicly known conditions can be applied. In the present embodiment, the liquid phase methods are desirable.

A metal oxide to be supported according to the liquid phase methods described above is in an amorphous state in many cases because crystallization has not progressed. By subjecting the amorphous precursor to a heat treatment at a high temperature of about 500° C. in an inert atmosphere, a crystalline metal oxide can be obtained. Such a crystalline metal oxide exhibits high performance even when used as the catalyst on the cathode.

On the other hand, precursor powder to be obtained when drying the amorphous precursor described above at a relatively low temperature of about 100 to 200° C. is in a hydrate state while maintaining the amorphous state. The hydrate of the metal oxide can be formally represented by $Me_xO_y \cdot nH_2O$ (where Me denotes any of the above metals; the subscripts x and y represent the number of metals and the number of oxygens contained in the metal oxide molecule, respectively; and n represents the number of moles of $H_2O$ based on 1 mol of the metal oxide). The hydrate of the metal oxide obtained by such low temperature drying can be used as the catalyst.

The amorphous metal oxide (hydrate) has hardly been sintered, and hence has a large surface area and exhibits a very small particle size of about 30 nm. These characteristics are suitable as the catalyst, and by using such an amorphous metal oxide, excellent battery performance can be obtained.

As mentioned above, a crystalline metal oxide exhibits high activity, but for the metal oxide that has been crystallized through a heat treatment at a high temperature as described above, the surface area thereof may be reduced significantly and the particle size thereof may also become about 100 nm due to aggregation of the particles. Note that this particle size (average particle size) is a value obtained by measuring the diameters of particles in a 10 μm square area (10 μm×10 μm) by observing the particles in an enlarged scale using a scanning electron microscope (SEM) or the like, and calculating the average value thereof.

Also, especially in a catalyst made of a metal oxide that has been subjected to a heat treatment at a high temperature, the particles are aggregated, and therefore, it may be difficult to add the catalyst onto the surface of the co-continuous body in a highly dispersed state. In order to obtain a sufficient catalytic effect, it may be necessary to add a large amount of the metal oxide into the cathode (co-continuous body), and it may be disadvantageous in cost to fabricate the catalyst through a heat treatment at a high temperature.

In order to solve this problem, the following production method 4, production method 5 and production method 6 may be used.

Method 4 for Producing Cathode

Figure 5:
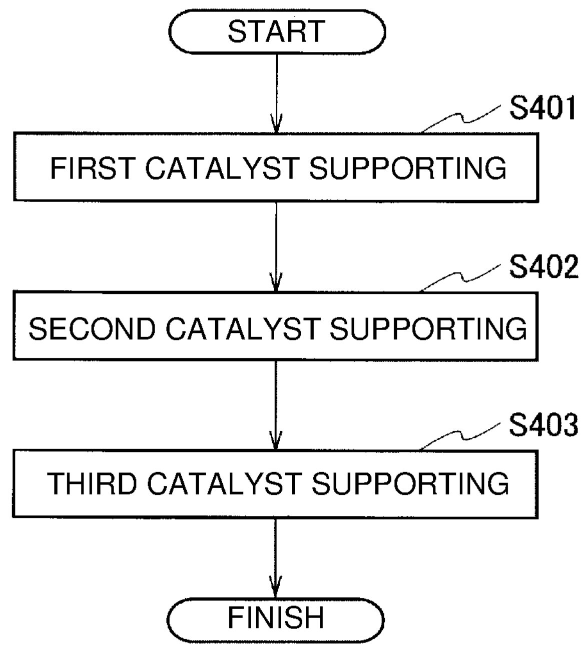
FIG. 5 is a flow chart illustrating methods 4, 5, and 6 for producing a cathode.

Next, a method 4 for producing the cathode 1 will be described with reference to FIG. 5. FIG. 5 is a flow chart for describing the methods 4, 5 and 6 for producing the cathode 1.

In the production method 4, the co-continuous body fabricated as described in the production method 1 and the production method 2 is allowed to support a catalyst. In the production method 4, in addition to the production of the co-continuous body mentioned above, the following catalyst supporting step is added in which the co-continuous body is allowed to support a catalyst.

At first, in a first catalyst supporting step of step S401, the co-continuous body is immersed in an aqueous solution of a surfactant to attach the surfactant on the surface of the co-continuous body.

Next, in a second catalyst supporting step of step S402, by using an aqueous solution of a metal salt, on the surface of the co-continuous body on which the surfactant has been attached, the metal salt is attached via the surfactant.

Next, in a third catalyst supporting step of step S403, through a heat treatment for the co-continuous body to which the metal salt has been attached, the co-continuous body is allowed to support a catalyst formed of the metal constituting the metal salt or an oxide of the metal.

Note that the metal described above is at least one metal among iron, manganese, zinc, copper, and molybdenum, or an oxide of at least one metal among calcium, iron, manganese, zinc, copper, and molybdenum. Manganese (Mn) or manganese oxide ($MnO_2$) is particularly preferable.

The surfactant to be used in the first catalyst supporting step of the production method 4 is for allowing the cathode (co-continuous body) 1 to support a metal or transition metal oxide thereon in a highly dispersed state. As long as a molecule has a hydrophobic group that is adsorbed onto the carbon surface and a hydrophilic group that adsorbs transition metal ions, like the surfactant, metal ions as the transition metal oxide precursor are allowed to be adsorbed onto the co-continuous body in a highly dispersed state.

The surfactant mentioned above is not particularly limited as long as a molecule has a hydrophobic group that is adsorbed onto the carbon surface and a hydrophilic group that adsorbs manganese ions, but a nonionic surfactant is preferable. For example, as an ester type surfactant, mention may be made of glycerin laurate, glycerin monostearate, sorbitan fatty acid ester, sucrose fatty acid ester and the like. In addition, as an ether type surfactant, mention may be made of polyoxyethylene alkyl ether, polyoxyethylene alkylphenyl ether, polyoxyethylene polyoxypropylene glycol and the like.

Moreover, as an ester ether type surfactant, mention may be made of polyoxyethylene sorbitan fatty acid ester, polyoxyethylene hexytan fatty acid ester, sorbitan fatty acid ester polyethylene glycol and the like. In addition, as an alkanol amide type surfactant, mention may be made of lauric acid diethanolamide, oleic acid diethanolamide, stearic acid diethanolamide, cocamide DEA, and the like. Also, as a higher alcohol surfactant, mention may be made of cetanol, stearyl alcohol, oleyl alcohol and the like. Furthermore, as a poloxamer type surfactant, mention may be made of poloxamer dimethacrylate and the like.

The concentration of the aqueous surfactant solution in the first catalyst supporting step of the production method 4 is preferably 0.1 to 20 g/L. In addition, the immersion conditions such as the immersion time and immersion temperature include, for example, immersing the co-continuous body in a solution at room temperature to 50° C. for 1 to 48 hours.

The second catalyst supporting step of the production method 4 includes further dissolving a metal salt that functions as a catalyst in the aqueous solution containing the surfactant in the first catalyst supporting step, or adding an aqueous solution of the metal salt thereto. Alternatively, apart from the aqueous solution containing the surfactant mentioned above, an aqueous solution in which a metal salt that functions as a catalyst is dissolved may be prepared, and the co-continuous body impregnated with the surfactant (to which the surfactant has been attached) may be immersed in this solution.

Also, the co-continuous body to which the surfactant has been attached may be impregnated with an aqueous solution in which a metal salt is dissolved. As necessary, an aqueous alkaline solution may be dropped on the obtained co-continuous body containing the metal salt (to which the metal salt has been attached). By doing these treatments, the metal or metal oxide precursor can be attached to the co-continuous body.

It is preferable that the amount of the metal salt added in the second catalyst supporting step of the production method 4 should be 0.1 to 100 mmol/L. In addition, the immersion conditions such as the immersion time and immersion temperature include, for example, immersing the co-continuous body in a solution at room temperature to 50° C. for 1 to 48 hours.

More specifically, if explanation is given by taking manganese as an example of the metal, for example, a manganese metal salt (for example, a manganese halide such as manganese chloride or its hydrate) is added to an aqueous solution that contains the surfactant and with which the co-continuous body is impregnated. Subsequently, by dropping an aqueous alkaline solution on the obtained co-continuous body containing the manganese metal salt, manganese hydroxide as a metal or metal oxide precursor is allowed to be supported on the co-continuous body.

The amount of the above-mentioned catalyst made of manganese oxide to be supported can be adjusted by the concentration of the metal salt (for example, manganese chloride) in the aqueous metal salt solution.

In addition, examples of the alkali to be used in the aqueous alkaline solution mentioned above may include a hydroxide of an alkali metal or alkali earth metal, aqueous ammonia, an aqueous ammonium solution, and an aqueous tetramethylammonium hydroxide (TMAH) solution. It is preferable that the concentration of these aqueous alkaline solutions should be 0.1 to 10 mol/L.

In the third catalyst supporting step in the production method 4, the metal or metal oxide precursor (metal salt), which has been attached to the surface of the co-continuous body, is converted into the metal itself or the metal oxide through a heat treatment.

Specifically, the co-continuous body to which the precursor has been attached may be dried at room temperature (about 25° C.) to 150° C., and more preferably 50° C. to 100° C. for 1 to 24 hours, and then subjected to a heat treatment at 100 to 600° C., and preferably 110 to 300° C.

In the third catalyst supporting step in the production method 4, by subjecting the co-continuous body to a heat treatment in an inert atmosphere such as argon, helium and nitrogen or in a reducing atmosphere, a cathode made of a co-continuous body, to the surface of which the metal itself is attached as a catalyst, can be produced. Also, a cathode made of a co-continuous body, to the surface of which the metal oxide is attached as a catalyst, can be produced by subjecting the co-continuous body to a heat treatment in gas containing an oxygen (oxidizing atmosphere).

Also, by subjecting the co-continuous body to a heat treatment under the reducing conditions mentioned above, a co-continuous body to which the metal itself is attached as a catalyst is once fabricated, and then by subjecting this to a heat treatment in an oxidizing atmosphere, a cathode made of a co-continuous body to which the metal oxide is attached as a catalyst can be produced.

As an alternative method, by drying the co-continuous body to which the metal or metal oxide precursor (metal salt) has been attached at room temperature to 150° C., more preferably 50° C. to 100° C., allowing the metal itself to be attached onto the co-continuous body as a catalyst, a metal/co-continuous body composite may be fabricated.

In the production method 4, the amount (content) of the attached catalyst made of the metal or metal oxide is 0.1 to 70% by weight, and is preferably 1 to 30% by weight based on the total weight of the co-continuous body and the catalyst.

According to the production method 4, a cathode in which the catalyst made of the metal or metal oxide is highly dispersed on the surface of the co-continuous body can be produced, and an aluminum-air battery with excellent battery characteristics can be configured.

Method 5 for Producing Cathode

Next, a method 5 for producing the cathode 1 will be described with reference to FIG. 5. In the production method 5, the co-continuous body fabricated as described in the production method 1 and the production method 2 is allowed to support a catalyst according to a method different from the production method 4 mentioned above. In the production method 5, in addition to the production of the co-continuous body mentioned above, the following catalyst supporting step is added in which the co-continuous body is allowed to support a catalyst.

At first, in a first catalyst supporting step of step S401, by immersing the co-continuous body in an aqueous solution of a metal salt, the metal salt is attached to the surface of the co-continuous body.

Next, in a second catalyst supporting step of step S402, through a heat treatment for the co-continuous body to which the metal salt has been attached, the co-continuous body is allowed to support a catalyst formed of the metal constituting the metal salt.

Next, in a third catalyst supporting step of step S403, by subjecting the co-continuous body on which the catalyst has been supported to water at high temperature and high pressure, the catalyst is changed into a metal oxide hydrate.

Note that the metal described above is at least one metal among iron, manganese, zinc, copper and molybdenum, or a metal oxide formed of at least one metal among calcium, iron, manganese, zinc, copper and molybdenum. Manganese or manganese oxide ($MnO_2$) is particularly preferable.

In the first catalyst supporting step in the production method 5, an aqueous solution of a metal salt, a metal or metal oxide precursor, which is ultimately to be a catalyst, is allowed to be attached (supported) on the surface of the co-continuous body. For example, an aqueous solution in which the metal salt described above is dissolved may be separately prepared, and the co-continuous body may be impregnated with this aqueous solution. The impregnation conditions and the like are the same as the conventional conditions as mentioned above.

The second catalyst supporting step in the production method 5 is the same as the third catalyst supporting step of the production method 4, and a heating treatment may be performed in an inert atmosphere or reducing atmosphere. Also, as described as the alternative method of the third catalyst supporting step of the production method 4, by subjecting the co-continuous body to which the precursor has been attached to a heating treatment (drying) at low temperature (room temperature to 150° C., more preferably 50° C. to 100° C.), the metal may be attached to the co-continuous body.

The cathode 1 using a metal itself as a catalyst exhibits high activity, but may be weak against corrosion lack long term stability because the catalyst is a metal. In contrast, by changing the metal into a metal oxide hydrate through a heating treatment according to a third catalyst supporting step of the production method 5, which will be described in detail below, long term stability can be achieved.

Next, in the third catalyst supporting step of the production method 5, the metal oxide hydrate is attached to the co-continuous body. Specifically, the co-continuous body obtained in the second catalyst supporting step of the production method 5, to which the metal has been attached, is immersed in water at high temperature and high pressure, thereby converting the attached metal into a catalyst formed of the metal oxide hydrate.

For example, the co-continuous body, to which the metal has been attached, may be immersed in water at 100° C. to 250° C., and more preferably 150° C. to 200° C., thereby oxidizing the attached metal into the metal oxide hydrate.

Since the boiling point of water at atmospheric pressure (0.1 MPa) is 100° C., normally, nothing can be immersed in water at 100° C. or higher at atmospheric pressure. However, by using a predetermined airtight container and elevating the internal pressure of this airtight container to, for example, 10 to 50 MPa, and preferably about 25 MPa, the boiling point of water rises in the airtight container, and liquid water at 100° C. to 250° C. can be achieved. When the co-continuous body to which the metal has been attached is immersed in the water at high temperature thus obtained, the metal can be changed into the metal oxide hydrate.

Method 6 for Producing Cathode

Next, a method 6 for producing the cathode 1 will be described. In the production method 6, the co-continuous body fabricated as described in the production method 1 and the production method 2 is allowed to support a catalyst according to a method different from the production methods 4 and 5 mentioned above. In the production method 6, in addition to the production of the co-continuous body mentioned above, the following catalyst supporting step is added in which the co-continuous body is allowed to support a catalyst. Note that the production method 6 is only up to the second catalyst supporting step and the third catalyst supporting step is not performed.

At first, in a first catalyst supporting step of step S401, by immersing the co-continuous body in an aqueous solution of a metal salt, the metal salt is attached to the surface of the co-continuous body.

Next, in a second catalyst supporting step of step S402, by subjecting the co-continuous body to which the metal salt has been attached to water at high temperature and high pressure, the co-continuous body is allowed to support a catalyst formed of a metal oxide hydrate made of the metal constituting the metal salt.

Note that the metal described above may be at least one metal among iron, manganese, zinc, copper and molybdenum.

The first catalyst supporting step in the production method 6 is the same as the first catalyst supporting step in the production method 5, and description will thus be omitted.

In the second catalyst supporting step in the production method 6, the precursor (metal salt) that has been attached to the surface of the co-continuous body is converted into the metal oxide hydrate through a heat treatment at a relatively low temperature.

Specifically, the co-continuous body, to which the precursor has been attached, is subjected to water at high temperature and high pressure, and then dried at a relatively low temperature of about 100 to 200° C. Consequently, the precursor is changed into a hydrate in which water molecules are present in particles, while maintaining the amorphous state of the precursor. The metal oxide hydrate obtained by such drying at low temperature is used as a catalyst.

In a cathode fabricated according to the production method 6, the metal oxide hydrate can be supported in a highly dispersed state on the co-continuous body as nanosized fine particles. Accordingly, when such a co-continuous body is used as a cathode, excellent battery performance can be exhibited.

The co-continuous body obtained by each of the production methods 1 to 6 described above can be molded into a predetermined shape by a publicly known procedure for use as a cathode 1. For example, a co-continuous body that has not supported a catalyst yet or that has supported a catalyst may be processed into the form of a plate, sheet, or powder, and packed into a cylindrical anode 2, which will be mentioned later, to obtain the cathode 1.

EXAMPLES

Configuration of Examples

Figure 6:
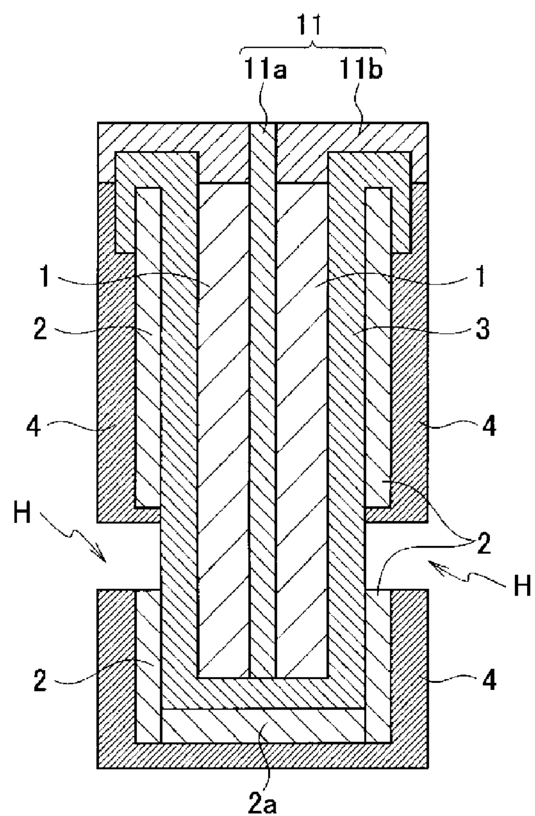
FIG. 6 is a cross-sectional view illustrating the configuration of a cylindrical aluminum-air battery.

Hereinafter, Examples of the aluminum-air battery will be described. At first, the configuration of an aluminum-air battery that was actually used will be described with reference to FIG. 6. FIG. 6 is a cross-sectional view illustrating a more detailed configuration example of a cylindrical aluminum-air battery.

As illustrated in FIG. 6, the cylindrical aluminum-air battery comprises a cathode 1, an anode 2, an electrolyte 3 arranged between the cathode 1 and the anode 2, and a cylindrical housing 4 arranged outside the anode 2.

The cathode 1 is arranged inside the anode 2 via the electrolyte (a separator, which will be mentioned later) 3. The cathode 1 is constituted by, for example, commercially available powdery carbon, a co-continuous body having a three dimensional network structure formed by an integrated plurality of nanostructures having branches. A cathode current collector 11 is provided in the cathode 1 and a collector unit is extracted outside the housing 4. The cathode current collector 11 comprises a collector electrode 11*a* for ensuring conduction with the cathode 1, and a current collector 11*b* for ensuring conduction and serving as a part of the housing. For example, it is constituted by an electrically conductive material such as carbon rod, carbon cloth, or graphite sheet.

The anode 2 is a metal, has a cylindrical shape, and has an open hole H that reaches the electrolyte (a separator, which will be mentioned later) 3. The open hole H allows for releasing the gas generated in the anode 2 into the atmosphere and taking in oxygen for use in the cathode reaction in the cathode 1. In the case where the housing 4 is not used, this cylindrical anode 2 itself constitutes the housing of the aluminum-air battery. It is desirable that the anode 2 should be constituted by a naturally degradable material.

The electrolyte 3 is a sheet-like separator that has been impregnated with (that has absorbed) an electrolytic solution. The separator is, as is the electrolyte 3, arranged between the cathode 1 and the anode 2.

The housing 4 has a cylindrical shape with a diameter that is one size larger than the diameter of the anode 2, and has an open hole H connected to the open hole H of the anode 2. In the case where the anode 2 serves as the housing of the aluminum-air battery, there may be no housing 4. It is desirable that the housing 4 should also be constituted by a naturally degradable material.

In an aluminum-air battery with the configuration mentioned above, the electrolyte 3 may be constituted by a sheet of a water absorbing insulator such as a coffee filter, kitchen paper, or filter paper. For example, as the electrolyte 3, it is particularly preferable to use a sheet of a naturally degradable material such as a cellulose based separator made from plant fibers.

The aluminum-air battery constituted by the naturally degradable material mentioned above is naturally degraded over time when used in a disposable device such as a soil moisture sensor, and hence does not need to be recovered. Also, since the battery is constituted by a nature derived material or fertilizer component, the load on the environment is extremely low. There is no need to recover the battery when it is used not only in soil but also in the natural world such as forest and ocean. In addition, when used in an ordinary living environment, the battery can be disposed as burnable waste.

Example 1

At first, Example 1 will be described. Example 1 is an example of using the perforated anode 2 and the housing 4, and using commercially available powdery carbon (KETJENBLACK EC600JD) as the cathode 1. The anode 2 and the cathode 1 were synthesized as described below. In the following description, as a representative example, aluminum is used for the anode 2. However, a metal-air battery of any metal species can be fabricated by changing the aluminum to an anode 2 made of another material.

Method for Fabricating Each Member

At first, a method for fabricating the cathode 1 will be described. KETJENBLACK powder (manufactured by Lion Specialty Chemicals Co., Ltd.) and polytetrafluoroethylene (PTFE) powder (manufactured by DAIKIN INDUSTRIES, LTD.) were sufficiently pulverized and mixed at a weight ratio of 80:20 by using a mortar machine, and subjected to roll forming, thereby obtaining a sheet-like cathode (thickness: 0.6 mm).

Figure 7A:
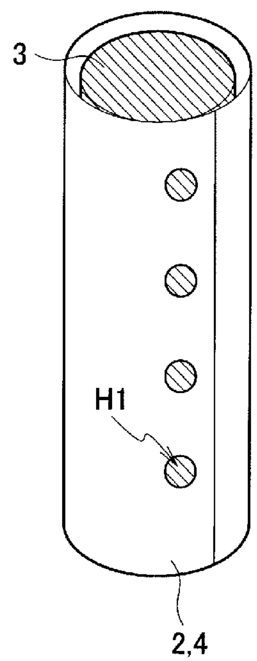
FIGS. 7(*a*) and 7(*b*) are external views illustrating the configuration of a cylindrical aluminum-air battery according to Example 1.
Figure 7B:
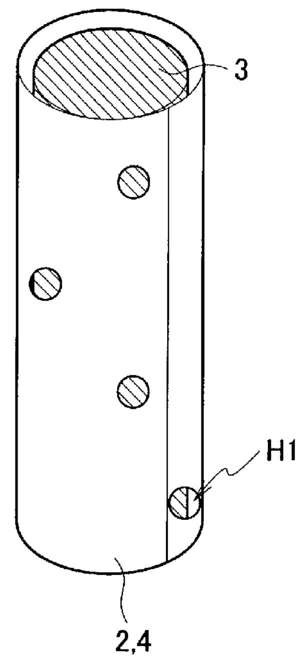

Next, a method for fabricating the perforated anode 2 illustrated in FIG. 7*a* will be described. A commercially available metallic aluminum pipe (thickness: 1 mm, outer diameter: 16 mm, manufactured by Alutec) was cut out in a length of 50 mm using a pipe cutter to make the anode 2. Then, the cut-out anode 2 was fixed with a vise or the like, scratched with a punch, and four open holes H1 with a diameter of 1 to 3 mm were made on the pipe at an interval of about 10 mm using a drill, drilling machine, or the like. The holes drilled by this approach may be anywhere on the anode, as illustrated in FIG. 7*b*.

As an electrolyte 3, a solution prepared by dissolving potassium chloride (KCl, manufactured by KANTO KAGAKU) in pure water at a concentration of 1 mol/L was used. As a separator, a cellulose based separator for batteries (manufactured by NIPPON KODOSHI CORPORATION) was used.

As for the housing 4 that wraps the anode 2, a biodegradable resin (manufactured by MIYOSHI OIL & FAT CO., LTD., thickness: 0.2 mm) was wrapped so that it overlapped the anode 2, fixed by thermocompression bonding, and perforated with a drill at the same positions as the open holes H1 of the anode 2 to provide open holes H1.

Method for Fabricating Air Battery

Using each of the members of the air battery described above, a cylindrical aluminum battery was fabricated.

At first, a rolled separator was inserted into the cylinder of the anode 2 so that the separator protruded from both upper and lower ends of the cylindrical pipe. With the flat surfaces of the cylinder as the bottom surface and the top surface, the separator protruding from the bottom surface was cut with scissors and folded into the inside of the cylinder. Furthermore, the separator on the top surface was also cut with scissors and folded outside the cylinder.

Next, the cathode 1 was cut to a size that could fit inside the separator as a roll, and then rolled and packed inside the separator. In addition, a carbon rod was inserted in the center as a collector electrode 11*a*, and the top surface of the cylinder was sealed using carbon cloth as a current collector 11*b*. Note that, by thermocompression bonding a biodegradable resin to the carbon cloth in advance except for the terminal part, the contact resistance of the fibers in the carbon cloth can be reduced, and also, after sealing, by overlapping the separator that has been folded outside the cylinder and thermocompression bonding them again, the biodegradable resin can also permeate through the electrolyte 3 and the housing 4. In this manner, the seal on the top surface was fixed.

On the bottom surface side of the cylinder, the cathode was made to have a diameter equal to the inner diameter of the cylinder of the anode 2. An aluminum plate 2*a* of the same material as that of the anode 2 was cut out and embedded in the bottom surface of the cylinder, and the bottom surface was sealed by thermally fusing the housing of the bottom surface and the housing of the side surface. Note that, since sealing with the housing is possible, it is possible to configure the aluminum-air battery without using the aluminum plate 2*a* described above.

Method of Discharge Test and Test Results

The battery performance of the cylindrical aluminum-air battery thus fabricated was measured.

Figure 8:
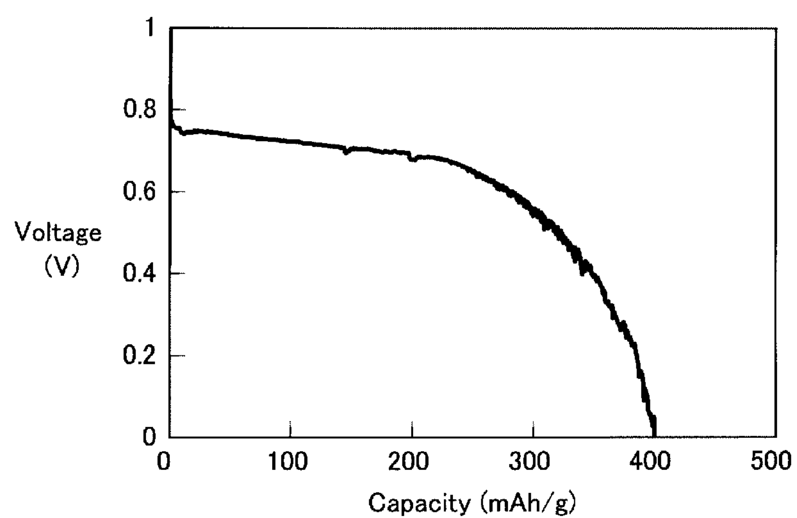
FIG. 8 is a characteristic diagram showing the initial discharge curve of a cylindrical aluminum-air battery according to Example 1.

At first, an electrolytic solution was allowed to permeate through one of the open holes H1 of the anode 2, and a discharge test was performed. The discharge test for the aluminum-air battery was conducted by using a commercially available charge/discharge measurement system (the SD8 charge/discharge system manufactured by HOKUTO DENKO CORPORATION). An electric current was supplied at a current density of 0.1 mA/cm$^2$ per unit effective area of the cathode 1, and measurement was continued until the battery voltage was decreased to 0 V from the open circuit voltage. In the discharge test for the battery, the measurement was conducted in a thermostatic tank at 25° C. (the atmosphere was an ordinary living environment). The discharge capacity was represented as the value (mAh/g) per weight of the cathode. FIG. 8 shows the discharge curve in Example 1.

The following Table 1 shows the discharge capacity of the aluminum-air battery using commercially available carbon powder as the cathode 1 and using the perforated aluminum pipe with open holes H1 as the anode 2. Table 1 also shows the results of Examples 2 and 3.

TABLE 1

| Open hole form in anode | Discharge voltage (V) |
|---|---|
| Example 1 (perforated) | 0.4 |
| Example 2 (slitted) | 0.6 |
| Example 3 (spiral) | 0.7 |
| No open holes (Comparative Example 1) | 0.2 |

Example 1 exhibited an average discharge voltage of 0.4 V or more. It exhibited a discharge capacity of 400 mAh/g or more. This value was larger than that of Comparative Example 1, which evaluated an aluminum-air battery using powdery carbon (KETJENBLACK EC600JD) as the cathode 1 and using an aluminum pipe with no open holes H1 as the anode 2, as will be mentioned later. The discharge voltage was improved presumably because oxygen was more easily supplied to the cathode 1 through the open holes H1 of the anode 2 and the reaction overvoltage of the cathode 1, which is the reaction rate-limiting factor of the aluminum-air battery, was thus lowered.

Example 2

Next, Example 2 will be described. Example 2 is an example of using the slitted anode 2 and the housing 4, and using commercially available powdery carbon (KETJENBLACK EC600JD) as the cathode 1. The fabrication of an aluminum-air battery and the method of a discharge test were carried out in the same manner as in Example 1. Hereinafter, a method for fabricating the anode 2 will be described.

A method for fabricating the slitted anode 2 illustrated in FIG. 9*a* will be described. A commercially available metallic aluminum pipe was cut out in a length of 50 mm using a pipe cutter, and an open hole H2 with a width of about 3 mm was fabricated by cutting one place of the aluminum pipe from the bottom surface to the top surface by using snips or the like. Note that the hole to be made by this approach can be of any length and at any location as illustrated in FIG. 9*b*, but when making two or more slits, it is preferable not to cut through from one end of the cylinder to the other end for the second and subsequent slits, but to leave a part of the cylinder intact in order to maintain the shape of the housing 4. The housing 4 wrapped around the anode 2 was fabricated by wrapping it around the anode 2 and thermocompression bonding them in the same manner as in Example 1, and then using scissors to make a slit in accordance with the position of the slit part created in Example 2.

A cylindrical aluminum-air battery was fabricated using the anode 2 made of this aluminum pipe in the same manner as in Example 1. The Table 1 described above shows the discharge voltage of the aluminum-air battery fabricated in Example 2. Example 2 exhibited an average discharge voltage of 0.6 V. This value was higher than that of the case using the perforated anode 2 in Example 1. Such improvement in characteristics is presumably because the use of the anode 2 with a larger open hole increased the oxygen supply to the cathode 1.

Example 3

Next, Example 3 will be described. Example 3 is an example of using the spiral anode 2 and the housing 4, and using commercially available powdery carbon (KETJENBLACK EC600JD) as the cathode 1. The fabrication of an aluminum-air battery and the method of a discharge test were carried out in the same manner as in Example 1. Hereinafter, a method for fabricating the anode 2 will be described.

A method for fabricating the spiral anode illustrated in FIG. 10 will be described. A commercially available metallic aluminum pipe was cut out in a length of 50 mm using a pipe cutter, and a diagonal slit with a width of about 3 mm was made from the bottom surface to the top surface at one place of the aluminum pipe by using snips or the like, thereby fabricating a spiral open hole H3. The housing 4 wrapped around the anode 2 was fabricated by wrapping it around the anode 2 and thermocompression bonding them in the same manner as in Example 1, and then using scissors to make a slit in accordance with the position of the slit part created in Example 3.

A cylindrical aluminum-air battery was fabricated using the anode 2 made of this aluminum pipe in the same manner as in Example 1. The Table 1 described above shows the discharge voltage of the aluminum-air battery fabricated in Example 3. Example 3 exhibited an average discharge voltage of 0.7 V. This value was higher than that of the case using the perforated anode 2 in Example 1 or that of the case using the slitted anode 2 in Example 2. Such improvement in characteristics is presumably because the use of the anode 2 with a larger open hole increased the oxygen supply to the cathode 1.

From the results of Examples 1 to 3, it was found that the highest voltage was obtained when the spiral anode was used as the form of the open hole H of the anode 2 in the cylindrical aluminum-air battery. Therefore, for the anode 2 from Example 4 onward, an anode 2 with a spiral open hole H shall be used. Note that FIG. 7, FIG. 9, and FIG. 10 are examples of the open hole H of the anode 2. The open hole H may be formed in the plane of the curved side of the cylinder. The open hole H may be formed from the plane of the curved side of the cylinder to reach either the upper end, the lower end, or both upper and lower ends of the cylinder. The open hole H may be formed in a spiral shape on the curved side of the cylinder from one end (upper end or lower end) to the other end (lower end or upper end) of the cylinder.

Example 4

Next, Example 4 will be described. An aluminum-air battery according to Example 4 can treat the anode 2 as the housing without providing the housing 4. Example 4 is an example of the aluminum-air battery used in Example 3 without providing the housing. The aluminum-air battery was fabricated in the same manner as in Example 3, and a discharge test was carried out in the same manner as in Example 1, without providing the housing 4. Note that the aluminum plate 2*a* cut out to fit the cylinder inner diameter, which was embedded in the bottom surface of the cylinder, does not need to be present in Example 4, since it may come off when there is no housing 4. Table 2 shows the discharge voltage and discharge capacity of the aluminum-air battery fabricated in Example 4.

TABLE 2

| With or without housing | Discharge voltage (V) | Discharge capacity (mAh/g) |
|---|---|---|
| Example 3 (with housing) | 0.7 | 400 |
| Example 4 (without housing) | 0.7 | 550 |

Example 4 exhibited an actual average discharge voltage of 0.7 V or more. It exhibited a discharge capacity of 550 mAh/g or more. Compared to the aluminum-air battery equipped with the housing 4 in Example 3, the discharge voltage remained the same and the discharge capacity was improved. This indicates that the area of contact between the anode 2 and the cathode 1 does not change depending on the presence or absence of the housing 4, and that there is no need to hold down the anode 2 with the housing 4. In addition, the reason for the increased discharge capacity is presumably because the elimination of the housing 4 can prevent the electrolytic solution from entering the narrow gap created between the housing 4 and the anode 2 by the capillary phenomenon, thereby suppressing the elution (corrosion) of the anode 2 not used in the battery reaction. As described above, by eliminating the housing 4, Al can be used more effectively in the battery reaction, without changing the voltage.

Based on the results of Example 4, from Example 5 onward, the constituent materials of the aluminum-air battery will be examined without using the housing 4.

Example 5

Example 5 is an example in which a co-continuous body having a three dimensional network structure formed of a plurality of nanosheets and nanofibers integrated through a noncovalent bond is used as the cathode 1. The cathode 1 was synthesized as described below. In the following description, a production method using graphene as the nanosheets and a production method using carbon nanofibers as the nanofibers will be shown as typical examples. By changing graphene and carbon nanofibers to nanosheets and nanofibers made of other materials, the co-continuous body having a three dimensional network structure can be adjusted. Note that the porosity shown below was calculated from the pore size distribution obtained by performing a mercury press-in method on the co-continuous body, modeling pores as a cylindrical shape.

At first, a method for fabricating the cathode 1 when using nanosheets as the cathode 1 will be described. A commercially available graphene sol [a dispersion medium: water ($H_2O$), 0.4% by weight, silicon manufactured by Sigma-Aldrich] was placed in a test tube, and this test tube was dipped in liquid nitrogen for 30 minutes to completely freeze the graphene sol. After completely freezing the graphene sol, the frozen graphene sol was taken out into an eggplant shaped flask and dried in a vacuum of 10 Pa or less by using a freeze drying machine (manufactured by TOKYO RIKAKIKAI CO., LTD.), thereby obtaining a stretchable co-continuous body having a three dimensional network structure including graphene nanosheets.

The obtained co-continuous body was evaluated by performing X-ray diffraction (XRD) measurement, scanning electron microscope (SEM) observation, porosity measurement, a tension test, and BET specific surface area measurement. The co-continuous body fabricated in Example 5 was confirmed to be a carbon (C, PDF card No. 01-075-0444) single phase through the XRD measurement. Note that the PDF card No. is the card number of the PDF (Powder Diffraction File), which is a database collected by ICDD (International Centre for Diffraction Data), and the same applies hereinafter.

It was also confirmed through the SEM observation and the mercury press-in method that the obtained co-continuous body is a co-continuous body in which the nanosheets (graphene pieces) continuously range and the average pore size is 1 μm. In addition, when the BET specific surface area of the co-continuous body was measured through the mercury press-in method, it was found to be 510 $m^2/g$. Also, when the porosity of the co-continuous body was measured through the mercury press-in method, it was found to be 90% or more. Furthermore, it was confirmed from the result of the tension test that, even when a strain of 20% was applied by tensile stress, the obtained co-continuous body does not depart from the elastic region and is restored to the shape before the application of the stress. Such a co-continuous body made of graphene was cut into a size that could be packed inside the anode 2, which will be described below, using a laser cutter to obtain the cathode 1.

Next, a method for fabricating the cathode 1 when using nanofibers as the cathode 1 will be described. The method for evaluating the co-continuous body was carried out in the same manner as for the above-mentioned co-continuous body made of nanosheets, and the fabrication of an aluminum-air battery and the method of a discharge test were carried out in the same manner as in Example 1.

The co-continuous body was fabricated in the same manner as in the above-mentioned method for fabricating the cathode 1 formed of nanosheets, and a carbon nanofiber sol [a dispersion medium: water ($H_2O$), 0.4% by weight, manufactured by Sigma-Aldrich] was used as a raw material.

The obtained co-continuous body was evaluated by performing XRD measurement, SEM observation, porosity measurement, a tension test, and BET specific surface area measurement. The co-continuous body fabricated in Example 5 was confirmed to be a carbon (C, PDF card No. 00-058-1638) single phase through the XRD measurement. It was also confirmed through the SEM observation and the mercury press-in method that the obtained co-continuous body is a co-continuous body in which the nanofibers continuously range and the average pore size is 1 μm. In addition, when the BET specific surface area of the co-continuous body was measured through the mercury press-in method, it was found to be 620 $m^2/g$. Also, when the porosity of the co-continuous body was measured through the mercury press-in method, it was found to be 93% or more. Furthermore, it was confirmed from the result of the tension test that, even when a strain of 40% was applied by tensile stress, the co-continuous body made of nanofibers does not depart from the elastic region and is restored to the shape before the application of the stress.

Table 3 shows the discharge capacities of aluminum-air batteries in which the co-continuous bodies were constituted from nanosheets made of carbon (C), iron oxide ($Fe_2O_3$), manganese oxide ($MnO_2$), zinc oxide (ZnO), molybdenum oxide ($MoO_3$), and molybdenum sulfide ($MoS_2$), and nanofibers made of carbon (C), iron oxide ($Fe_2O_3$), manganese oxide ($MnO_2$), zinc oxide (ZnO), molybdenum oxide ($MoO_3$), and molybdenum sulfide ($MoS_2$) and used as the cathode 1.

TABLE 3

| Cathode material | | Discharge capacity (mAh/g) |
|---|---|---|
| Nanosheet material | Graphene (C) | 650 |
| | Iron oxide ($Fe_2O_3$) | 630 |
| | Manganese oxide ($MnO_2$) | 660 |
| | Zinc oxide (ZnO) | 620 |
| | Molybdenum oxide ($MoO_3$) | 600 |
| | Molybdenum sulfide ($MoS_2$) | 600 |
| Nanofiber material | Carbon nanofiber (C) | 730 |
| | Iron oxide ($Fe_2O_3$) | 700 |
| | Manganese oxide ($MnO_2$) | 720 |
| | Zinc oxide (ZnO) | 710 |
| | Molybdenum oxide ($MoO_3$) | 720 |
| | Molybdenum sulfide ($MoS_2$) | 700 |
| Powder | Example 4 (powdery carbon) | 550 |

In the case where co-continuous bodies made of nanosheets were used, all aluminum-air batteries exhibited discharge capacities of 600 mAh/g or more, the values of which are larger than that of Example 4 for evaluating the cathode 1 using powdery carbon. In the example cases of nanosheets made of materials other than carbon as well, similar to graphene, they have large specific surface areas and the discharge product [$Al(OH)_3$] was thus efficiently deposited, and this presumably improved the discharge capacity.

In the case where co-continuous bodies made of nanofibers were used, all aluminum-air batteries exhibited discharge capacities of 700 mAh/g or more, the values of which are larger than those of the co-continuous bodies including the nanosheets, as a whole. In the example cases of these nanofibers as well, similar to the carbon nanofibers, the stretchable cathode 1 efficiently deposited the discharge product [$Al(OH)_3$], and this presumably improved the discharge capacity.

Example 6

In Example 6, a cathode 1 will be described, which is configured by allowing a co-continuous body made of carbon nanofibers to support an oxide or metal as a catalyst. In the following, a case in which the co-continuous body is allowed to support $MnO_2$ as a catalyst will be described as a typical example. Note that, by changing Mn to an arbitrary metal, an arbitrary oxide is allowed to be supported on the co-continuous body as a catalyst. In addition, by not performing neutralization step, an arbitrary metal is allowed to be supported on the co-continuous body as a catalyst.

The fabrication of and method for evaluating the co-continuous body, the fabrication of an aluminum-air battery, and the method of a discharge test were carried out in the same manner as in Examples 4 and 5. Subsequently, commercially available manganese (II) chloride tetrahydrate ($MnCl_2.4H_2O$; manufactured by KANTO KAGAKU) was dissolved in distilled water, and the fabricated co-continuous body was impregnated with the solution, thereby allowing manganese chloride to be supported. Then, neutralization was carried out by gradually dropping aqueous ammonia (28%) on the co-continuous body supporting manganese chloride (or on manganese chloride supported by the co-continuous body) until the pH became 7.0, thereby depositing manganese hydroxide. The deposit was repeatedly washed with distilled water five times so that no chlorine remained.

The obtained co-continuous body supporting manganese hydroxide was subjected to a heat treatment at 500° C. in an argon atmosphere for 6 hours, thereby fabricating a co-continuous body supporting manganese oxide ($MnO_2$). The co-continuous body supporting manganese oxide thus fabricated was evaluated by performing XRD measurement and TEM observation. Through the XRD measurement, the peak of manganese oxide ($MnO_2$, PDF file No. 00-011-079) were observed. It was confirmed that the catalyst supported by the co-continuous body was a manganese oxide single phase. In addition, with the TEM, manganese oxide was observed to be deposited in the form of particles having an average particle size of 100 nm on the surface of the co-continuous body.

By using this co-continuous body supporting manganese oxide as the cathode 1, a circular aluminum-air battery similar to that of Example 4 was fabricated. The average discharge voltage of the aluminum-air battery fabricated in Example 6 was 1.0 V. In addition, the following Table 4 also shows the results when using other catalysts.

TABLE 4

| Catalyst/co-continuous body material | Discharge voltage (V) |
| --- | --- |
| $MnO_2$/C | 1.0 |
| $Fe_2O_3$/C | 0.9 |
| ZnO/C | 0.8 |
| $MoO_3$/C | 0.9 |
| Fe/C | 1.0 |
| Mn/C | 1.0 |
| Zn/C | 0.9 |
| Mo/C | 0.9 |
| Example 5 (C) | 0.7 |

Example 6 exhibited an average discharge voltage of 1.0 V. This value was larger than that of the case when using the co-continuous body in Example 5 not supporting the catalyst. It is believed that not only the stretchability of the cathode 1, but also the supporting of the catalyst on the cathode 1 lowers the reaction resistance in the cathode 1 and improves the discharge voltage.

Example 7

In Example 7, a case in which "a co-continuous body made of a gel in which nanofibers produced by a bacterium had been dispersed" or "a co-continuous body made of a gel in which cellulose produced by a bacterium had been dispersed" was allowed to support manganese oxide ($MnO_2$) as a catalyst will be described. In the following, a case where nanofibers made of iron oxide produced by an iron bacterium were used as the "nanofibers produced by a bacterium" will be presented. However, by changing the iron bacterium to an arbitrary bacterium, a co-continuous body made of nanofibers made of manganese oxide can be adjusted.

The method for evaluating the co-continuous body, the method for fabricating an aluminum-air battery, and the method of a discharge test were carried out in the same manner as in Examples 4 and 5.

Method for Fabricating Co-Continuous Body Made of Gel in which Nanofibers Produced by Bacterium are Dispersed At first, *Leptothrix ochracea*, which is an iron bacterium, was placed in a JOP liquid culture medium in a test tube together with iron pieces (purity: 99.9% or more, manufactured by Kojundo Chemical Lab. Co., Ltd.), and was cultured on a shaker at 20° C. for 14 days. The JOP liquid culture medium is a culture medium containing, in 1 L of sterilized ground water, 0.076 g of disodium hydrogen phosphate dodecahydrate, 0.02 g of potassium dihydrogen phosphate dihydrate, 2.383 g of HEPES [4-(2-hydroxyethyl)-1-piperazineethanesulfonic acid: a substance for a buffer solution], and 0.01 mmol/L of iron sulfate, the pH of which is adjusted to 7.0 with an aqueous sodium hydroxide solution. Also, *Leptothrix ochracea* was purchased from ATCC (American Type Culture Collection).

After the culture, the iron pieces were removed, and the obtained gel was washed in pure water for 24 hours by using a shaker. In this washing, pure water was changed three times. By using the washed gel as a raw material, a co-continuous body was fabricated according to the same process as described in Example 5. After that, an aluminum-air battery was fabricated in the same manner as the battery fabrication method described in Example 1 and the catalyst supporting method described in Example 6.

The obtained co-continuous body was evaluated by performing XRD measurement, SEM observation, porosity measurement, a tension test, and BET specific surface area measurement. The co-continuous body fabricated in Example 7 was confirmed to be amorphous $Fe_3O_4$ and $\gamma$-$Fe_2O_3$ ($Fe_3O_4$, PDF card No. 01-075-1372 and $\gamma$-$Fe_2O_3$, PDF card No. 00-039-1346) through the XRD measurement.

It was also confirmed through the SEM observation that the obtained co-continuous body is a co-continuous body in which hollow nanofibers (nanotubes) having a diameter of 1 μm continuously range. In addition, when the BET specific surface area of the co-continuous body was measured through the mercury press-in method, it was found to be 800 $m^2/g$. Also, when the porosity of the co-continuous body was measured through the mercury press-in method, it was found to be 95% or more. Furthermore, it was confirmed from the result of the tension test that, even when a strain of 60% was applied by tensile stress, the co-continuous body of Example 4 does not depart from the elastic region and is restored to the shape before the application of the stress.

Method for Fabricating Co-Continuous Body Made of Gel in which Cellulose Produced by Bacterium are Dispersed Next, a fabrication method by which a co-continuous body made of a gel in which cellulose produced by a bacterium has been dispersed is further allowed to support manganese oxide ($MnO_2$) as a catalyst will described.

At first, nata de coco (manufactured by Fujicco) was provided as a bacterial cellulose gel produced by *Acetobacter xylinum*, which is an *acetobacter*, and then, using this nata de coco, an aluminum battery was fabricated in the same manner as the battery fabrication method described in Example 4 and the catalyst supporting method described in Example 6. Note that, when using the bacterial cellulose gel, it was dried in a vacuum and the co-continuous body was then carbonized through calcination in a nitrogen atmosphere at 1200° C. for 2 hours, thereby fabricating the cathode 1.

The obtained co-continuous body (carbonized co-continuous body) was evaluated by performing XRD measurement, SEM observation, porosity measurement, a tension test, and BET specific surface area measurement. This co-continuous body was confirmed to be a carbon (C, PDF card No. 01-071-4630) single phase through the XRD measurement. It was also confirmed through the SEM observation that the obtained co-continuous body is a co-continuous body in which nanofibers having a diameter of 20 nm continuously range. In addition, when the BET specific surface area of the co-continuous body was measured through the mercury press-in method, it was found to be 830 $m^2/g$. Also, when the porosity of the co-continuous body was measured through the mercury press-in method, it was found to be 99% or more. Furthermore, it was confirmed from the result of the tension test that, even when a strain of 80% was applied by tensile stress, the co-continuous body of Example 5 does not depart from the elastic region and is restored to the shape before the application of the stress, and that the co-continuous body has excellent stretchability even after the carbonization.

The discharge voltages of the aluminum-air battery in which the co-continuous body made of the iron oxide nanofibers produced by the iron bacterium was used as the cathode and the aluminum-air battery in which the co-continuous body made of the cellulose nanofibers produced by the bacterium was used as the cathode 1 in Example 7 are shown in the following Table 5. In addition, the following Table 5 also shows the result when using another co-continuous body.

TABLE 5

| Catalyst/co-continuous body material | Discharge voltage (V) |
|---|---|
| $MnO_2$/bacterium-produced iron oxide | 1.1 |
| $MnO_2$/bacterium-produced iron oxide $MnO_2$ | 1.1 |
| $MnO_2$/carbonized bacterial cellulose | 1.2 |

In Example 7, as shown in Table 5, the aluminum-air battery including the cathode 1 using a co-continuous body made of manganese oxide produced by a bacterium and supporting manganese oxide as a catalyst exhibited an average discharge voltage of 1.1 V. This value was larger than that of Example 6. The manganese oxide produced by a bacterium was produced by culturing *Leptothrix discophora*, which is a manganese bacterium, in the same manner as mentioned above by using manganese pieces (purity: 99.9% or more, manufactured by Kojundo Chemical Lab. Co., Ltd.). *Leptothrix discophora* was purchased from ATCC. In the case of nanofibers produced by this bacterium as well, similar to the iron oxide produced by the iron bacterium, the cathode produced by the bacterium having excellent stretchability efficiently carried out oxygen reduction, and this presumably improved the discharge voltage.

Furthermore, the aluminum-air battery including the cathode 1 using a co-continuous body made of cellulose produced by a bacterium and supporting manganese oxide as a catalyst exhibited an average discharge voltage of 1.2 V. This value was larger than that of the case when using a co-continuous body supporting manganese oxide and containing iron oxide produced by an iron bacterium.

The improvement in characteristics as described above is presumably because, by using the co-continuous body having higher stretchability, the cathode 1 efficiently deposited the discharge product [$Al(OH)_3$] during discharge and also the reaction was performed smoothly due to excellent electrical conductivity of C.

As mentioned above, according to Example 7, a co-continuous body having high porosity and stretchability is obtained. In addition, an aluminum-air battery using this co-continuous body as the cathode 1 achieves efficient deposition of the discharge product [$Al(OH)_3$] during discharge. The improvement in characteristics as described above is presumably because of a variety of improvements according to the present invention.

Example 8

In Example 8, the carbonized bacterial cellulose supporting manganese oxide used in Example 7 was used, and the method for testing the co-continuous body, the fabrication of an aluminum-air battery, and the method of a discharge test were carried out in the same manner as in Examples 4 and 5. For adjustment of the electrolytic solution, a solution prepared by dissolving in pure water at a concentration of 1 mol/L was used. However, the solubilities of magnesium citrate, calcium citrate, calcium carbonate, and calcium oxalate in water are low, and therefore, solutions obtained by dissolving them in a 0.1 mol/L citric acid were used. Also, for aqueous solutions exhibiting acidity such as pH 1 to 4 (for example, acidic solutions not containing salts of acetic acid, citric acid, malic acid, oxalic acid, malic acid, and the like), an aqueous NaOH solution was used to adjust the pH to around 6.0.

Figure 11:
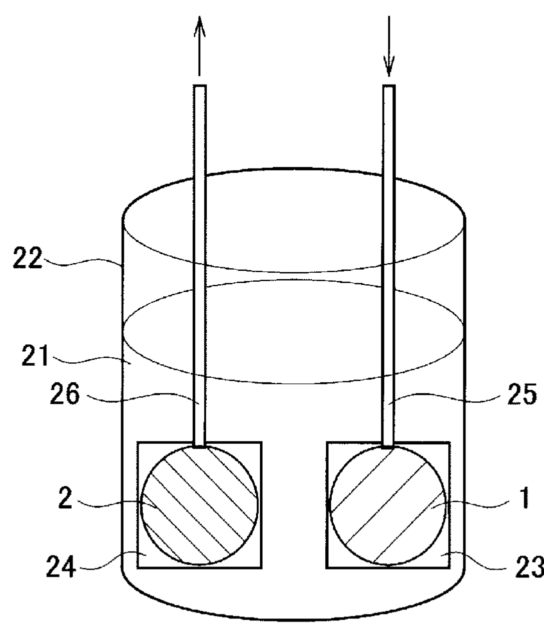
FIG. 11 is a constitutional view illustrating the configuration of a pH measuring cell according to Example 8.

For the pH measurement, a pH measuring instrument (manufactured by HORIBA, Ltd., D-52) was used. As shown in FIG. 11, the battery reaction was allowed to progress in a beaker cell 22 filled with an electrolytic solution 21 and the pH before and after the reaction was measured. The cathode 1 and the anode 2 were adjusted by cutting into a circular shape having a diameter of 14 mm by using a punching blade, laser cutter, or the like. At first, the periphery of a copper mesh foil 23 (manufactured by MTI Japan) was fixed through spot welding, and the cathode 1 was installed inside the copper mesh foil 23. Also, the anode 2 constituted by an aluminum plate was similarly fixed to the inside of another copper mesh foil 24 (manufactured by MTI Japan) through spot welding. To these copper mesh foils, copper ribbons 25 and 26 were fixed through spot welding in advance, respectively. A charge/discharge measurement system (manufactured by HOKUTO DENKO CORPORATION, the SD8 charge/discharge system) was connected to these copper ribbons 25 and 26. Then, an electric current was supplied at a current density of 0.1 $mA/cm^2$ per unit effective area of the cathode 1, and the electric current was kept supplied until the battery voltage was decreased to 0 V from the open circuit voltage.

The following Table 6 shows the discharge capacities and pH values before and after measurement of aluminum-air batteries using sodium chloride, magnesium chloride, potassium chloride, calcium chloride, acetic acid, sodium acetate, magnesium acetate, potassium acetate, calcium acetate, carbonic acid, sodium carbonate, magnesium carbonate, potassium carbonate, calcium carbonate, citric acid, sodium citrate, magnesium citrate, potassium citrate, calcium citrate, malic acid, sodium malate, magnesium malate, potassium malate, calcium malate, oxalic acid, sodium oxalate, magnesium oxalate, potassium oxalate, calcium oxalate, phosphoric acid, HEPES, sodium pyrophosphate, and sodium metaphosphate as electrolytes.

TABLE 6

| Electrolyte | Discharge capacity (mAh/g) | pH Before | pH After |
|---|---|---|---|
| Sodium chloride | 1130 | 6.8 | 11.2 |
| Magnesium chloride | 1000 | 6.9 | 10.9 |
| Potassium chloride | 1100 | 6.8 | 10.8 |
| Calcium chloride | 1010 | 6.8 | 11.0 |
| Acetic acid | 1090 | 6.1 | 10.8 |
| Sodium acetate | 1220 | 7.5 | 8.8 |
| Magnesium acetate | 1260 | 7.8 | 8.3 |
| Potassium acetate | 1210 | 7.6 | 8.9 |
| Calcium acetate | 1180 | 7.5 | 8.8 |
| Carbonic acid | 1060 | 6.7 | 11.3 |
| Sodium carbonate | 1230 | 7.8 | 11.4 |
| Magnesium carbonate | 1150 | 6.8 | 11.2 |
| Potassium carbonate | 1230 | 7.5 | 11.1 |
| Calcium carbonate | 1200 | 7.4 | 11.0 |
| Citric acid | 1010 | 5.9 | 8.0 |
| Sodium citrate | 1280 | 6.8 | 9.5 |
| Magnesium citrate | 1110 | 5.6 | 9.4 |
| Potassium citrate | 1270 | 5.5 | 9.6 |
| Calcium citrate | 1220 | 5.7 | 9.6 |
| Malic acid | 1030 | 6.0 | 8.6 |
| Sodium malate | 1240 | 5.6 | 8.0 |
| Magnesium malate | 1190 | 5.5 | 8.8 |
| Potassium malate | 1230 | 5.3 | 8.7 |
| Calcium malate | 1210 | 5.6 | 8.6 |
| Oxalic acid | 1000 | 6.1 | 8.1 |
| Sodium oxalate | 1210 | 5.6 | 8.9 |
| Magnesium oxalate | 1180 | 5.4 | 8.6 |
| Potassium oxalate | 1230 | 5.5 | 8.6 |
| Calcium oxalate | 1210 | 5.6 | 8.7 |
| Phosphoric acid | 1010 | 6.0 | 8.3 |
| HEPES | 1190 | 6.3 | 10.5 |
| Sodium pyrophosphate | 1190 | 6.1 | 10.6 |
| Sodium metaphosphate | 1180 | 6.2 | 10.4 |

In Example 8, when salts were used as the electrolyte, the discharge capacity exhibited was 1100 mAh/g or more. Some salts exhibited values larger than the cases where potassium chloride was used as the electrolyte, as in Examples 1 to 7. In particular, the discharge capacity of salts not containing magnesium ions was large.

The improvement in characteristics as described above is presumably because, by using the electrolytic solution containing no chloride ion, corrosion of the anode 2 by chloride ions could be suppressed. Also, the reason for small discharge capacities of electrolytic solutions containing magnesium ions or calcium ions is presumably because the pH of the aqueous solution becomes higher as the battery reaction progresses, at which time magnesium hydroxide or calcium hydroxide with low solubility is deposited, inhibiting the battery reaction.

As mentioned above, according to Example 8, the use of salts not containing chloride ions, magnesium ions, or calcium ions achieves improvement in the discharge capacity. In addition, since electrolytic solutions used in Example 8 are components used as a fertilizer and the like, they are preferable electrolytic solutions from the viewpoint of environmental load as well. The improvement in characteristics as described above is presumably because of a variety of improvements according to the present invention.

Example 9

Next, Example 9 will be described. In Example 9, a discharge test was carried out on an aluminum-air battery fabricated according to the same procedure as in Example 4, using the anode 2 as the housing and using the cathode fabricated in Example 7, under an environment imitating soil.

Table 7 shows the average discharge voltage of the aluminum-air battery in Example 9.

TABLE 7

| Catalyst/co-continuous body material | Discharge voltage (V) |
|---|---|
| Example 7 ($MnO_2$/carbonized bacterial cellulose) | 1.20 |
| Example 9 ($MnO_2$/carbonized bacterial cellulose) | 1.16 |

Example 9 exhibited an average discharge voltage of 1.16 V, as shown in Table 7. This value was lower than that in Example 6, but it was demonstrated that the battery operates with no problem even under the soil environment. Also, when the aluminum-air battery in Example 9 was left to stand in soil after discharge, the battery completely disappeared in about a month from the start of the discharge test.

Comparative Example 1

Lastly, Comparative Example 1 will be described. In Comparative Example 1, a cylindrical aluminum-air battery was fabricated using the same cathode as in Example 1 and an anode not having open holes. The conditions of a discharge test for the battery were the same as in Example 1. The average discharge voltage of the aluminum-air battery according to Comparative Example 1 is as shown in Table 1.

As shown in Table 1, the average discharge voltage of Comparative Example 1 was 0.20 V, the value of which is smaller than that in Example 1. Also, when the cathode 1 of Comparative Example 1 was observed after the measurement, the cathode inside the separator was completely submerged in water. Furthermore, it was observed that, due to the hydrogen generated from the anode 2 by contact with the electrolytic solution, a gap was created between the separator and the anode 2, and the anode part not in contact with the separator was not used for the battery reaction, resulting in a decrease in the reaction area, which not only caused the resistance of the battery, but also caused a reduction in the capacity.

From the above results, it was confirmed that the aluminum-air batteries of the present embodiment and Examples 1 to 9 are superior to the conventional aluminum-air batteries in terms of voltage and capacity.

Effects

As described above, the present invention uses the cathode 1 constituted by a co-continuous body having a three dimensional structure formed by an integrated plurality of nanostructures having branches, and therefore, there is no need to use a binder to form a cathode as in the past. Also, the air battery of the present invention comprises: the cylindrical anode 2 made of a metal; the cathode 1; and the separator (electrolyte 3) that is arranged between the cathode 1 and the anode 2 and absorbs an electrolytic solution, where the cathode 1 is arranged inside the anode 2 via the separator and the anode 2 has an open hole reaching the separator and constitutes the housing of the air battery, and therefore, the housing for accommodating the cathode, such as powdery carbon, as in conventional air batteries can be eliminated. As a result, the structure of the battery cell can be simplified.

In addition, according to the present invention, since the anode 2 and the housing 4 are constituted by a naturally degradable material, the disposal of the air battery at the time of use and disposal becomes easier. Specifically, the air battery of the present invention does not contain any metal elements other than the elements used in fertilizers for soil or metals contained in rain water and sea water, and is also naturally degradable, which extremely decreases the environmental load. Such an air battery can be effectively utilized as a disposable battery in a daily environment, as well as the driving source for various devices such as a sensor to be used in soil.

Due to the above, a technology that allows for easy handling of air batteries can be provided.

Moreover, according to the present invention, since the cathode 1 is constituted by a co-continuous body having a three dimensional network structure formed by an integrated plurality of nanostructures having branches, the anode 2 is configured as the housing of the air battery, and the open hole is formed on the anode 2, it is possible to achieve an air battery that can be easily handled while enabling the discharge capacity and discharge voltage to be increased.

Furthermore, according to the present invention, since the cathode 1 has a catalyst, it is possible to achieve an air battery that can be easily handled while enabling the discharge capacity and discharge voltage to be further increased.

Note that the present invention is not limited to the embodiments described above, and it is obvious that those having ordinary skill in the art can make many modifications and combinations without departing from the technical idea of the invention.

REFERENCE SIGNS LIST

1 Cathode (air electrode)
11*a* Collector electrode
11*b* Current collector
2 Anode
2*a* Aluminum plate
3 Electrolyte
4 Housing
11 Cathode current collector
21 Electrolytic solution
22 Beaker cell
23 and 24 Copper mesh foil
25 and 26 Copper ribbon

The invention claimed is:

1. An air battery using oxygen in air as a cathode active material, the air battery comprising:

a cylindrical anode made of a metal;

a cathode constituted by a co-continuous body having a three dimensional network structure formed by an integrated plurality of nanostructures having branches;

a separator that is arranged between the cathode and the anode and absorbs an electrolytic solution; and a cylindrical housing arranged outside the anode, wherein the cathode is arranged inside the anode via the separator, the anode has an open hole reaching the separator and constitutes a housing of the air battery, and the cylindrical housing has an open hole connected to the open hole of the anode.

2. The air battery according to claim 1, wherein the housing is constituted by a naturally degradable material.

3. The air battery according to claim 1, wherein the open hole of the anode is formed in a plane of a curved side of the cylinder, is formed from a plane of a curved side of the cylinder to reach either an upper end, a lower end, or both upper and lower ends of the cylinder, or is formed in a spiral shape on a curved side of the cylinder from one end to the other end of the cylinder.

4. The air battery according to claim 1, wherein:

the nanostructure is a nanosheet constituted by at least one of carbon, iron oxide, manganese oxide, zinc oxide, molybdenum oxide, and molybdenum sulfide, or a nanofiber constituted by at least one of carbon, iron oxide, manganese oxide, zinc oxide, molybdenum oxide, molybdenum sulfide, and cellulose;

the cathode has a catalyst constituted by at least one metal among iron, manganese, zinc, copper, and molybdenum, or a catalyst constituted by an oxide of at least one metal among calcium, iron, manganese, zinc, copper, and molybdenum; and the electrolytic solution is constituted by one or more of acetic acid, carbonic acid, citric acid, malic acid, oxalic acid, phosphoric acid, or a salt thereof, HEPES (4-(2-hydroxyethyl)-1-piperazineethanesulfonic acid), a chloride salt, a pyrophosphate, and a metaphosphate.

5. A method for producing a cathode of an air battery using oxygen in air as a cathode active material, the air battery comprising:

a cylindrical anode made of a metal;

a cathode constituted by a co-continuous body having a three dimensional network structure formed by an integrated plurality of nanostructures having branches;

a separator that is arranged between the cathode and the anode and absorbs an electrolytic solution; and a cylindrical housing arranged outside the anode, wherein:

the cathode is arranged inside the anode via the separator;

the anode has an open hole reaching the separator and constitutes a housing of the air battery, and the cylindrical housing has an open hole connected to the open hole of the anode, the method comprising producing the cathode by freezing a sol or gel in which the nanostructure is dispersed, and drying the frozen body in a vacuum.

6. A method for producing a cathode of an air battery using oxygen in air as a cathode active material, the air battery comprising:

a cylindrical anode made of a metal;

a cathode constituted by a co-continuous body having a three dimensional network structure formed by an integrated plurality of nanostructures having branches; and a separator that is arranged between the cathode and the anode and absorbs an electrolytic solution; and a cylindrical housing arranged outside the anode, wherein:

the cathode is arranged inside the anode via the separator;

the anode has an open hole reaching the separator and constitutes a housing of the air battery, and the cylindrical housing has an open hole connected to the open hole of the anode, the method comprising producing the cathode by the method comprising producing the cathode by allowing a predetermined bacterium to produce a gel in which nanofibers of any of iron oxide, manganese oxide, and cellulose are dispersed, freezing the produced gel, drying the frozen body in a vacuum, and carbonizing the dried body.

7. The method for producing a cathode of an air battery according to claim 5, further comprising allowing the cathode to support a catalyst.

8. The air battery according to claim 2, wherein the open hole of the anode is formed in a plane of a curved side of the cylinder, is formed from a plane of a curved side of the cylinder to reach either an upper end, a lower end, or both upper and lower ends of the cylinder, or is formed in a spiral shape on a curved side of the cylinder from one end to the other end of the cylinder.

9. The air battery according to claim 2, wherein:

the nanostructure is a nanosheet constituted by at least one of carbon, iron oxide, manganese oxide, zinc oxide, molybdenum oxide, and molybdenum sulfide, or a nanofiber constituted by at least one of carbon, iron oxide, manganese oxide, zinc oxide, molybdenum oxide, molybdenum sulfide, and cellulose;

the cathode has a catalyst constituted by at least one metal among iron, manganese, zinc, copper, and molybdenum, or a catalyst constituted by an oxide of at least one metal among calcium, iron, manganese, zinc, copper, and molybdenum; and the electrolytic solution is constituted by one or more of acetic acid, carbonic acid, citric acid, malic acid, oxalic acid, phosphoric acid, or a salt thereof, HEPES (4-(2-hydroxyethyl)-1-piperazineethanesulfonic acid), a chloride salt, a pyrophosphate, and a metaphosphate.

10. The air battery according to claim 3, wherein:

the nanostructure is a nanosheet constituted by at least one of carbon, iron oxide, manganese oxide, zinc oxide, molybdenum oxide, and molybdenum sulfide, or a nanofiber constituted by at least one of carbon, iron oxide, manganese oxide, zinc oxide, molybdenum oxide, molybdenum sulfide, and cellulose;

the cathode has a catalyst constituted by at least one metal among iron, manganese, zinc, copper, and molybdenum, or a catalyst constituted by an oxide of at least one metal among calcium, iron, manganese, zinc, copper, and molybdenum; and the electrolytic solution is constituted by one or more of acetic acid, carbonic acid, citric acid, malic acid, oxalic acid, phosphoric acid, or a salt thereof, HEPES (4-(2-hydroxyethyl)-1-piperazineethanesulfonic acid), a chloride salt, a pyrophosphate, and a metaphosphate.

11. The method for producing a cathode of an air battery according to claim 6, further comprising allowing the cathode to support a catalyst.

* * * * *